US011226083B2

(12) United States Patent
Vernier et al.

(10) Patent No.: US 11,226,083 B2
(45) Date of Patent: Jan. 18, 2022

(54) TOROIDAL NON-GLARY LUMINAIRE

(71) Applicant: ABL IP Holding LLC, Atlanta, GA (US)

(72) Inventors: Etienne Vernier, Montreal (CA); Tahereh Ahmadi Tameh, Montreal (CA); Louis Thomas-Berube, Montreal (CA); Dirk Zylstra, Montreal (CA); Jerome Poulin, Montreal (CA)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 16/876,707

(22) Filed: May 18, 2020

(65) Prior Publication Data

US 2021/0356097 A1 Nov. 18, 2021

(51) Int. Cl.
*F21V 13/12* (2006.01)
*F21V 7/00* (2006.01)
(Continued)

(52) U.S. Cl.
CPC .............. *F21V 13/12* (2013.01); *F21S 8/026* (2013.01); *F21V 5/043* (2013.01); *F21V 7/0058* (2013.01);
(Continued)

(58) Field of Classification Search
CPC .......... F21V 13/12; F21V 29/70; F21V 17/02; F21V 7/0058; F21V 17/105; F21V 7/008;
(Continued)

(56) References Cited

U.S. PATENT DOCUMENTS 8,454,204 B1 * 6/2013 Chang ................ F21V 29/773
362/294
8,573,823 B2 11/2013 Dau et al.
(Continued)

FOREIGN PATENT DOCUMENTS

WO 2013140337 9/2013

OTHER PUBLICATIONS

"Edge-X in General Lighting", Lighting—QuarkStar: A Brighter Idea, Available Online at https://www.quarkstar.com/lighting.html 1/9, Accessed from Internet on: Aug. 24, 2020, 9 pages.

*Primary Examiner* — Peggy A Neils
(74) *Attorney, Agent, or Firm* — Kilpatrick Townsend & Stockton LLP

(57) ABSTRACT

A non-glare luminaire includes a toroidal-shaped light engine having light emitting diodes (LEDs) disposed about the light engine in a radial pattern. The light engine has an axial direction that is at least substantially orthogonal to the surface of the light engine. An anti-glare ring is disposed proximate the light engine and includes reflectors arranged in a radial pattern. Each reflector is configured to reflect tangentially oriented light from at least one of the LEDs substantially along the axial direction. The luminaire also includes a toroidal integrated optic (TIO), which is made up of a total internal reflectance (TIR) lens that is coupled with a light guide. The TIO optic has a toroidal lens portion having a light entrance side that receives light from the LEDs and the reflectors. The optic collimates the light received from the LEDs and the reflectors and emit the light via a light exit side.

23 Claims, 32 Drawing Sheets

(51) Int. Cl.
*F21V 5/04* (2006.01)
*F21V 29/70* (2015.01)
*F21V 11/14* (2006.01)
*F21V 8/00* (2006.01)
*F21V 21/14* (2006.01)
*F21V 17/10* (2006.01)
*F21V 17/02* (2006.01)
*F21V 21/04* (2006.01)
*F21S 8/02* (2006.01)
*F21Y 115/10* (2016.01)

(52) U.S. Cl.
CPC ............ *F21V 7/0083* (2013.01); *F21V 11/14* (2013.01); *F21V 17/02* (2013.01); *F21V 17/105* (2013.01); *F21V 21/047* (2013.01); *F21V 21/14* (2013.01); *F21V 29/70* (2015.01); *G02B 6/0038* (2013.01); *F21Y 2115/10* (2016.08)

(58) Field of Classification Search
CPC ........ F21V 11/14; F21V 5/043; F21V 21/047; F21V 21/14; F21V 7/0083; F21V 7/06; G02B 6/0038; F21S 8/026; F21Y 2115/10; F21Y 2103/33
See application file for complete search history.

(56) References Cited

U.S. PATENT DOCUMENTS

| | | | |
|---|---|---|---|
| 9,028,120 B2 | 5/2015 | Dau et al. | |
| 9,791,129 B2* | 10/2017 | Dennis | F21S 41/18 |
| 9,803,814 B2* | 10/2017 | Grant | F21V 21/047 |
| 10,240,764 B2* | 3/2019 | Morales | F21S 8/026 |
| 10,330,269 B2* | 6/2019 | Hierzer | F21V 3/062 |
| 10,508,789 B2 | 12/2019 | Kennedy | |
| 10,591,120 B2* | 3/2020 | Bailey | F21V 5/04 |
| 10,697,599 B1* | 6/2020 | Davis | F21K 9/69 |
| 2013/0033872 A1* | 2/2013 | Randolph | F21S 8/02 362/294 |
| 2017/0268733 A1* | 9/2017 | Johnston | F21V 5/10 |
| 2018/0216973 A1* | 8/2018 | Irgang | F21V 23/005 |
| 2020/0363031 A1* | 11/2020 | Jha | F21S 41/143 |

* cited by examiner

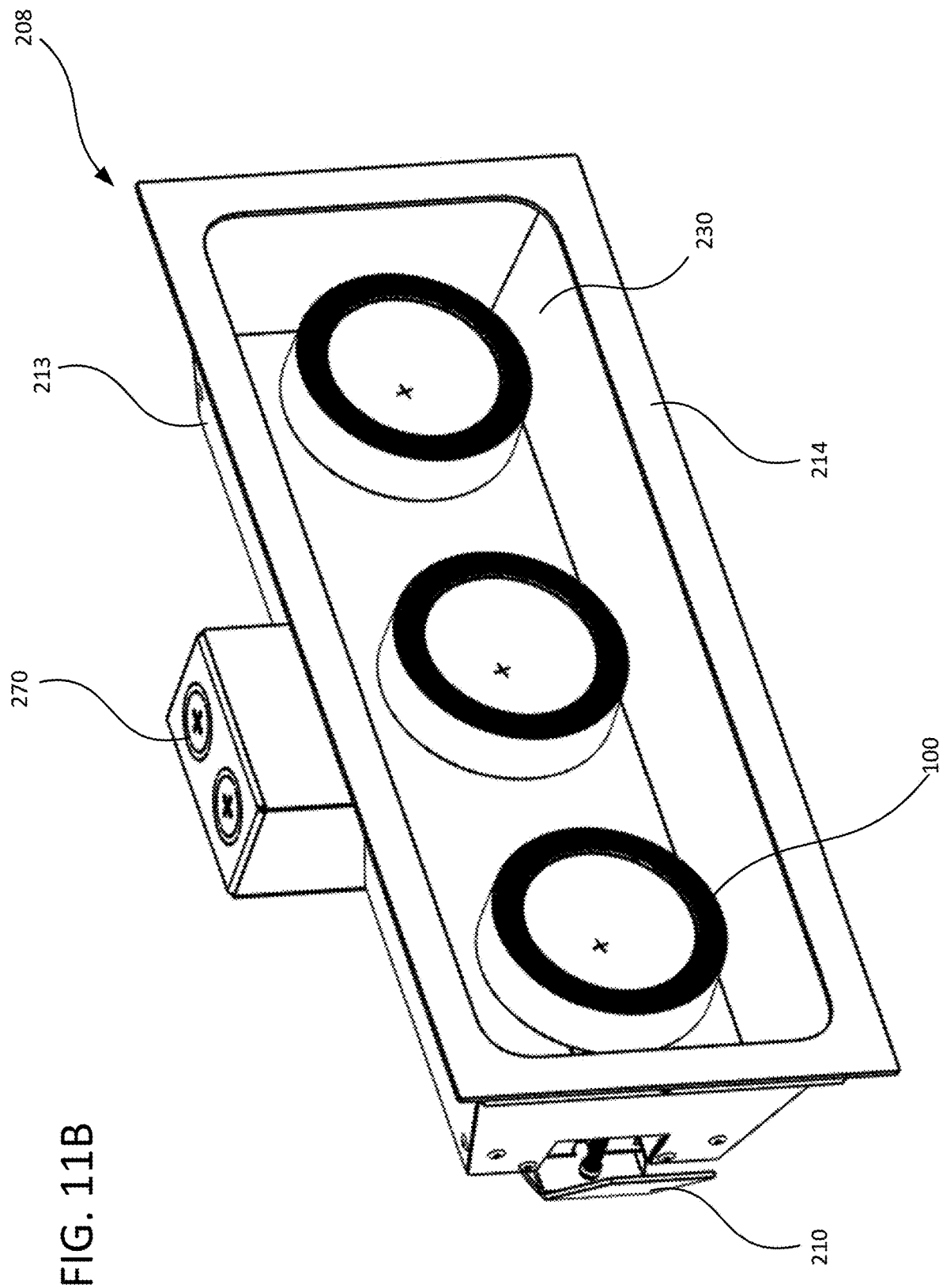

US 11,226,083 B2

TOROIDAL NON-GLARY LUMINAIRE

BACKGROUND OF THE INVENTION

Many conventional luminaires suffer from problems related to glare. This glare is uncomfortable to the human eye and makes the luminaire less aesthetically pleasing. Adjusting a lighting direction of existing luminaires may be difficult, especially if a user wants to position the luminaire to direct light in a directly downward position, or if a user wishes to adjust the luminaire quickly with a single hand. Additionally, when installed in recessed lighting applications, oftentimes conventional luminaires can be difficult and/or dangerous to install. This is due to the need for the user to support the luminaire and/or housing within the ceiling recess while attempting to wire the luminaire into a structure's power system. This installation is often performed while the user is standing on a ladder, making the installation with a single hand even more dangerous. Solutions to these and other problems are desired.

BRIEF SUMMARY OF THE INVENTION

Embodiments of the present invention are directed to luminaires, adjustment mechanisms, and installation techniques. In particular embodiments of the invention are directed to halo-shaped luminaires that produce uniform light. Embodiments are also directed to magnetic adjustment mechanisms that allow the luminaires to be pivoted and/or otherwise manipulated to adjust an angle of the light emitted from the luminaire. These magnetic adjustment mechanisms enable a user to quickly and easily adjust the angle of the luminaire. Additionally, these adjustment mechanisms provide solutions that enable a user to quickly orient the luminaire in a directly downward relative to a supporting structure. Embodiments further provide a luminaire housing that simplifies the installation processes when luminaires are installed in ceiling recesses. Such housings employ spring-biased locking arms to secure the housing within a recess once inserted above a top surface of a ceiling.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 11B is a bottom perspective view of the housing of FIG. 11A.

DETAILED DESCRIPTION OF THE INVENTION

Figure 1A:
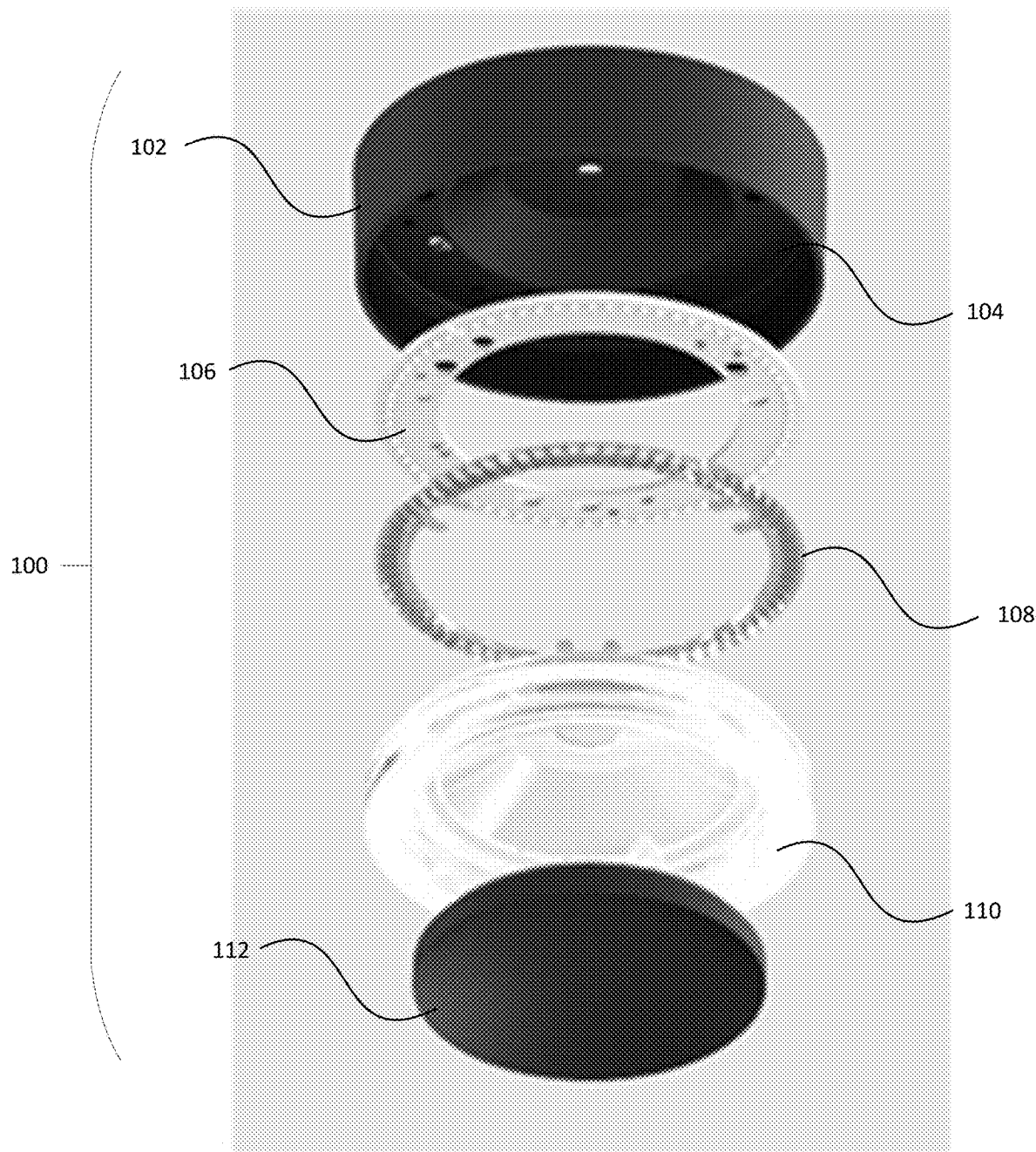
FIG. 1A is an exploded view of a luminaire according to embodiments.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present disclosure are directed to luminaires that produce a visually uniform light ring. Embodiments achieve these effects using a combination of features. For example, in some embodiments, a toroidal integrated optic (TIO), which is made up of a TIR lens that is coupled with a light guide, may be used to generate halo shaped light (however, it will be appreciated that in some embodiments the optic may have non-toroidal shapes, such as rectangles, elliptical shapes, etc.). In some embodiments, the TIO may include a lenticular feature that uniformly blends the light, such as a radial pattern that diffuses the light emitted from the TIO. In some embodiments, the luminaire may also include an anti-glare ring that reflects azimuthally-oriented, radial direction light emitted from one or more light sources (such as light emitting diodes (LEDs)) and re-orients the light into the TIO. This directs the light into a more narrow beam prior to entry into the TIO, which results in a reduction of the glare field of the luminaire.

Embodiments of the invention may also provide mechanisms that allow the orientation of the luminaire to be easily and quickly adjusted, in some cases with only a single hand. For example, the luminaire may be secured to a structure via a magnetic element. The luminaire may include a base that includes a domed portion that is received within the magnetic element. The interface between the domed structure and the magnetic element allows the luminaire to be pivoted and/or otherwise moved to adjust the orientation of the luminaire. In some embodiments, a distal section of the domed structure may be flattened. This flattened area allows a user to readily adjust the luminaire to a directly downward orientation by centering the magnetic element on the flattened portion of the domed structure.

Embodiments may further enable quick and easy installation techniques. For example, the luminaire may be received within a housing that is used to mount the luminaire within a recess of a ceiling. The housing may include locking arms that are biased outward to a neutral position that extends beyond a periphery of the recess. The locking arms are angled downward and outward from the housing such that as the housing is inserted into the recess, the top surfaces of the locking arms contact edges of the ceiling and force the bottommost ends of the locking arms inward. Once the arms are fully inserted into the recess, the arms may spring outward to the neutral position such that the bottommost ends sit atop edges of the ceiling. A lower lip may be provided on the housing at a height that is below the bottommost ends of the locking arms. The lower lip may rest against an underside of the ceiling to maintain the housing at a desired position, with the ceiling sandwiched between the bottommost ends of the locking arms and the lower lip. In some embodiments, an adjustment mechanism is provided to adjust a distance between the bottommost ends of the locking arms and the lower lip to which may be useful to accommodate ceilings of various thicknesses and/or to allow clearance for an installer to wire the luminaire and/or perform other tasks.

Figure 1B:
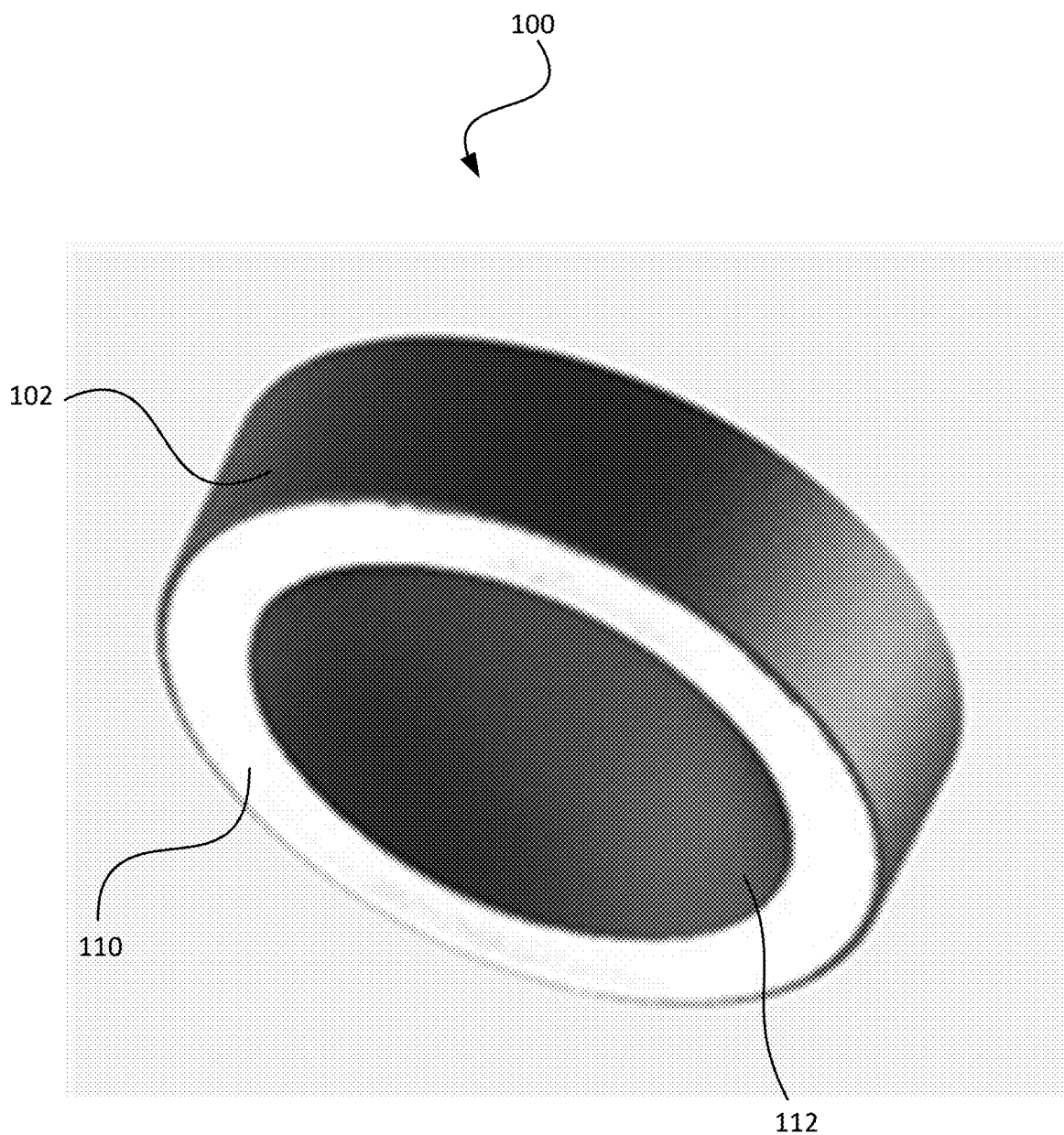
FIG. 1B is a perspective view of the luminaire of FIG. 1A.
Figure 1C:
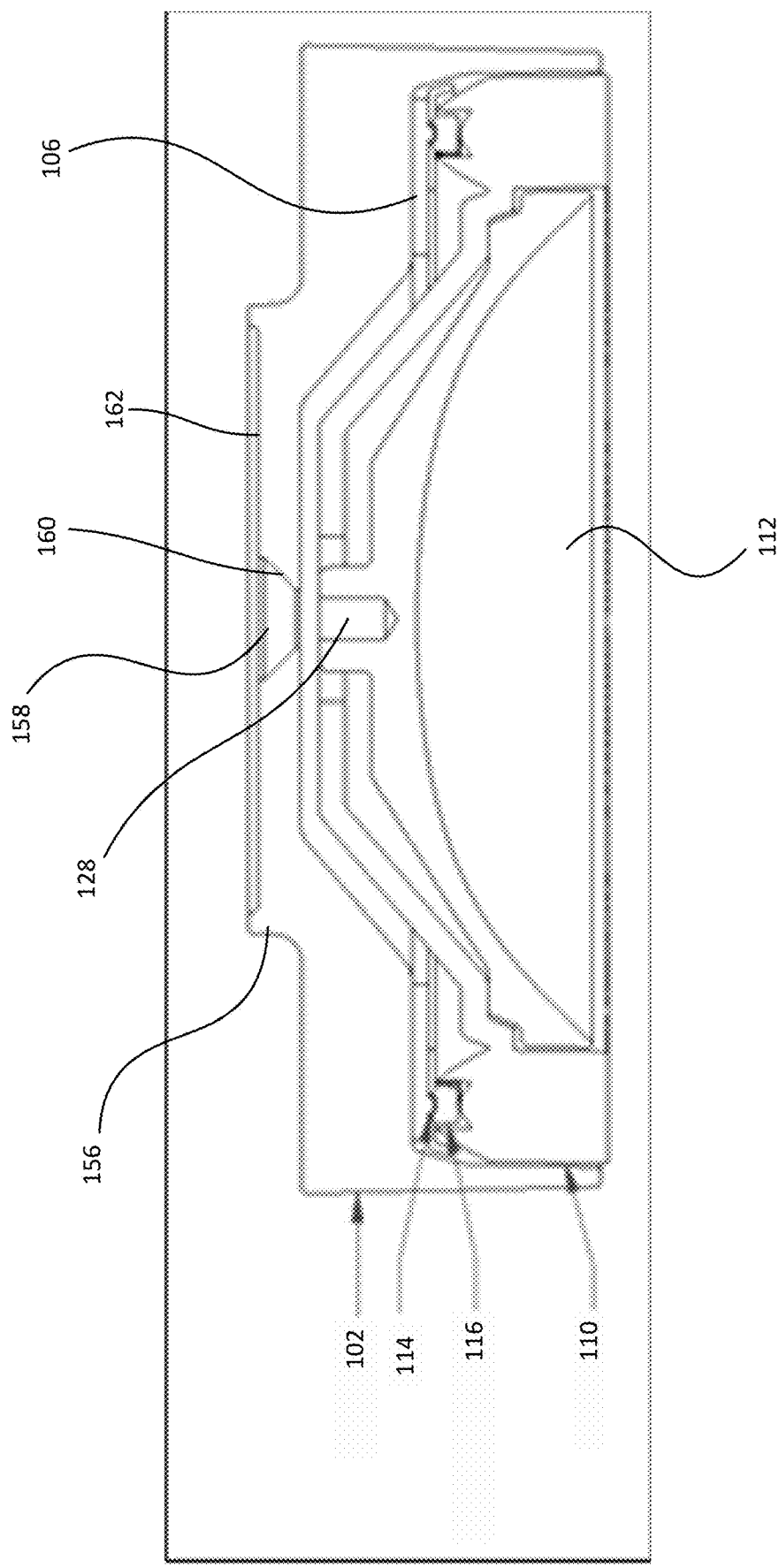
FIG. 1C is a cross-section of the luminaire of FIG. 1A.

Turning now to FIGS. 1A-1C, one embodiment of a luminaire 100 is illustrated. Luminaire 100 includes a base 102 that is usable to mount the luminaire 100 to a supporting structure (such as a ceiling, beam, housing, and/or other structure). As illustrated, the base 102 has a generally cylindrical shape, however other shapes are possible. In some embodiments, the base 102 may operate as a heat sink for the luminaire 100. In these and other embodiments, the base 102 may be formed from a conductive material such as, but not limited to, copper or aluminum. In other embodiments, the base 102 may be formed of other materials, such as other metals and/or plastics. The base 102 may define an interior 104 that receives various internal components of the luminaire 100. For example, a light engine 106, anti-glare ring 108, toroidal integrated optic (TIO) 110, and/or cover 112 may be received within the interior 104 of the base 102.

In the present embodiment, the light engine 106 is annular in shape and may include a number of light elements, such as LEDs 114, that are spaced along a surface of the light engine 106 in a radial pattern. The light engine 106 may include, for example an annular printed circuit board on which the LEDs 114 are mounted. It will be understood that other shapes of light engines may be used, having other patterns of LEDs. For example, luminaires according to other embodiments may be elliptical, polygonal, or have another shape. The anti-glare ring 108 may be positioned below the light engine 106 and may include a number of reflectors 116 that are configured to reflect tangentially-oriented light emitted from respective ones of the light elements and to re-orient the light into the TIO 110. This arrangement provides a luminaire 100 that produces a visually uniform resulting light pattern. In some embodiments, the luminaire 100 may also include cover 112 that extends over an interior of the luminaire 100 and provides a contrasted look to the TIO 110 in both an illuminated and unilluminated state. As illustrated in FIGS. 1B and 1C, the light engine 106, anti-glare ring 108, TIO 110, and cover 112 are all configured to be received within the interior 104 of the base 102. This results in a compact luminaire 100 having a toroidal optic (and resulting light pattern) that has a distinct outer periphery a distinct center as best illustrated in FIG. 1B. In some embodiments, a fastener 128, such as a screw, may be inserted through the base 102, the light engine 106, anti-glare ring 108, TIO 110, and/or cover 112 to secure the components together, as best shown in FIG. 1C.

Figure 2:
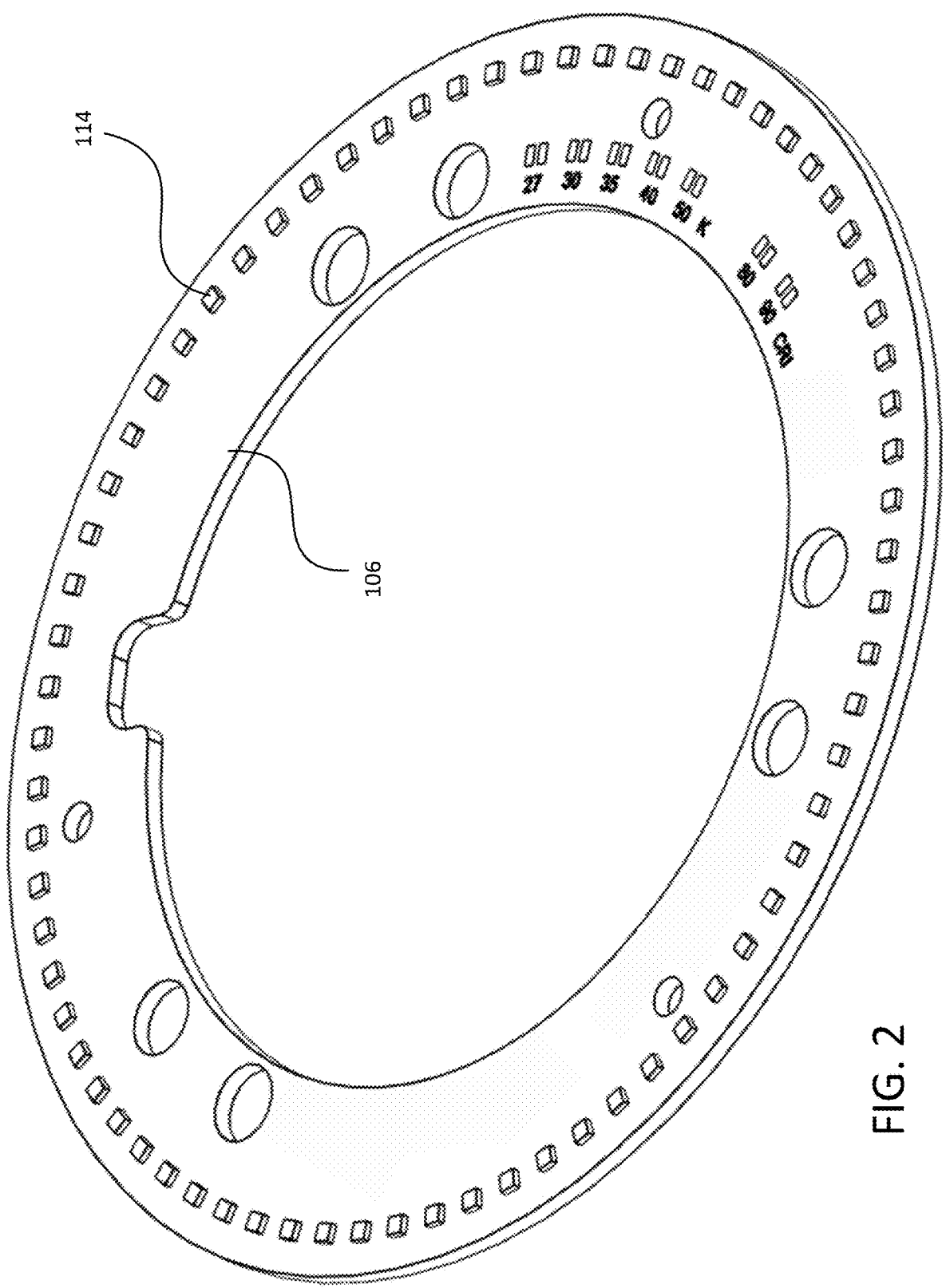
FIG. 2 is a perspective view of a light engine according to embodiments.

FIG. 2 illustrates one embodiment of the light engine 106. As illustrated, light engine 106 in generally annular in shape and includes a number of LEDs 114 disposed about a surface of the light engine 106 in a radial pattern. In some embodiments, the LEDs 114 may be centered in a body of the light engine 106, while in other embodiments the LEDs 114 may be disposed off-center of the light engine 106 as shown here. While illustrated with a single row of LEDs 114 positioned at regular intervals, it will be appreciated that other arrangements of LEDs 114 are possible. For example, multiple rows of LEDs 114 and/or LEDs 114 that are spaced irregularly about the periphery of the light engine 106 may be utilized. However, by using a symmetrical and regular arrangement of LEDs 114, light emitted from the light engine 106 may be more uniform and more visually appealing. By using a number of LEDs 114 that are spaced out along the surface of the light engine 106, the thermal distribution of the luminaire 100 is improved, thereby allowing the base 102 to be more compact than in single source LED embodiments (such as chip on board lights with a reflector or diffuser) while still serving as an effective heat sink. The use of a high number of LEDs 114 also enables the luminaire 100 to provide a high lumen output and/or projector size ratio. Additionally, a greater number of LEDs 114 reduces the electrical load of each individual LED 114, extending a lifetime of the LEDs 114. The light engine 106 may also include a LED driver and/or other optical, thermal, mechanical and/or electrical components (not shown) that are necessary to operate the LEDs 114 of the luminaire 100.

Figure 3:
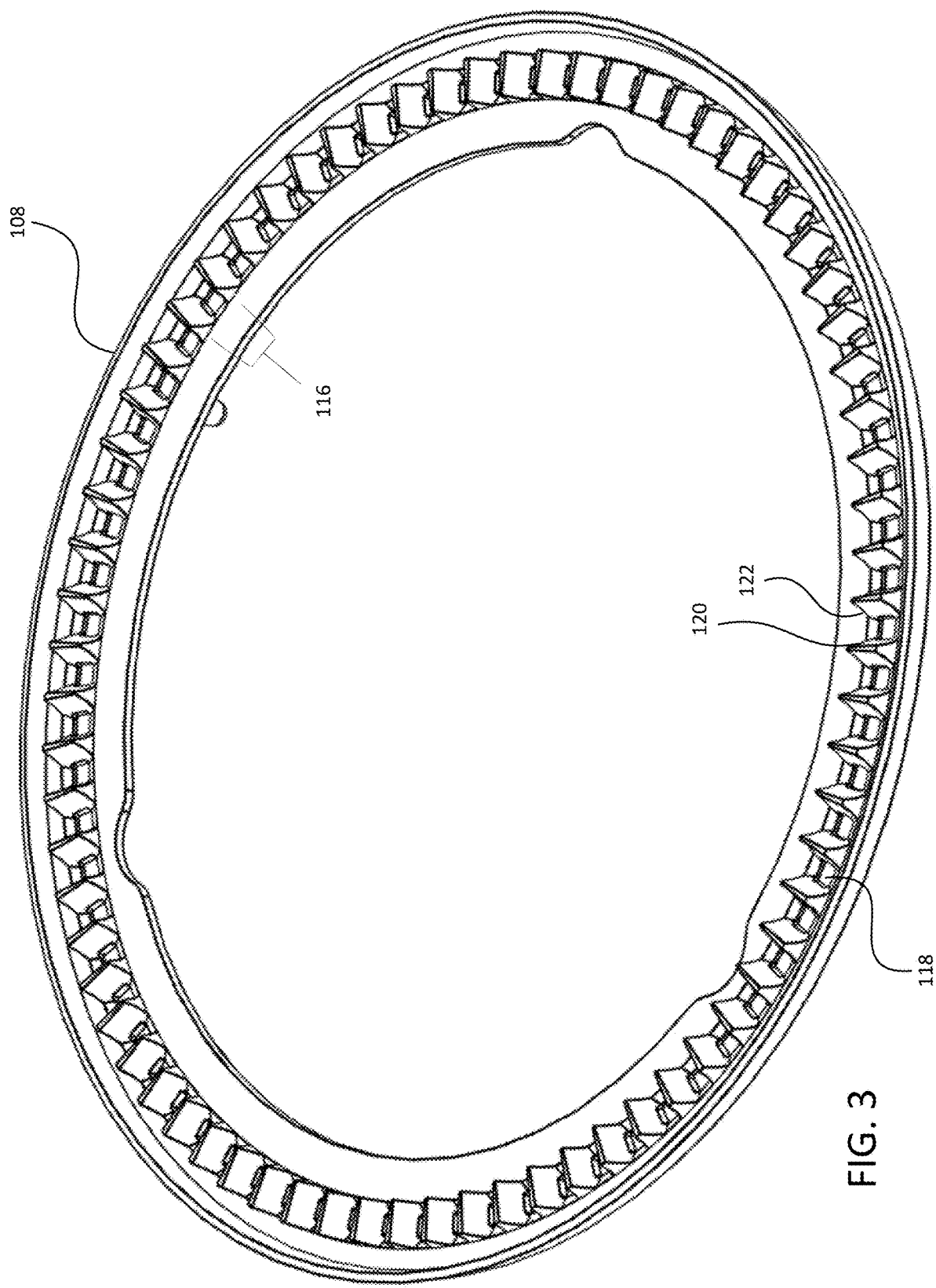
FIG. 3 is a perspective view of an anti-glare ring according to embodiments.
Figure 3A:
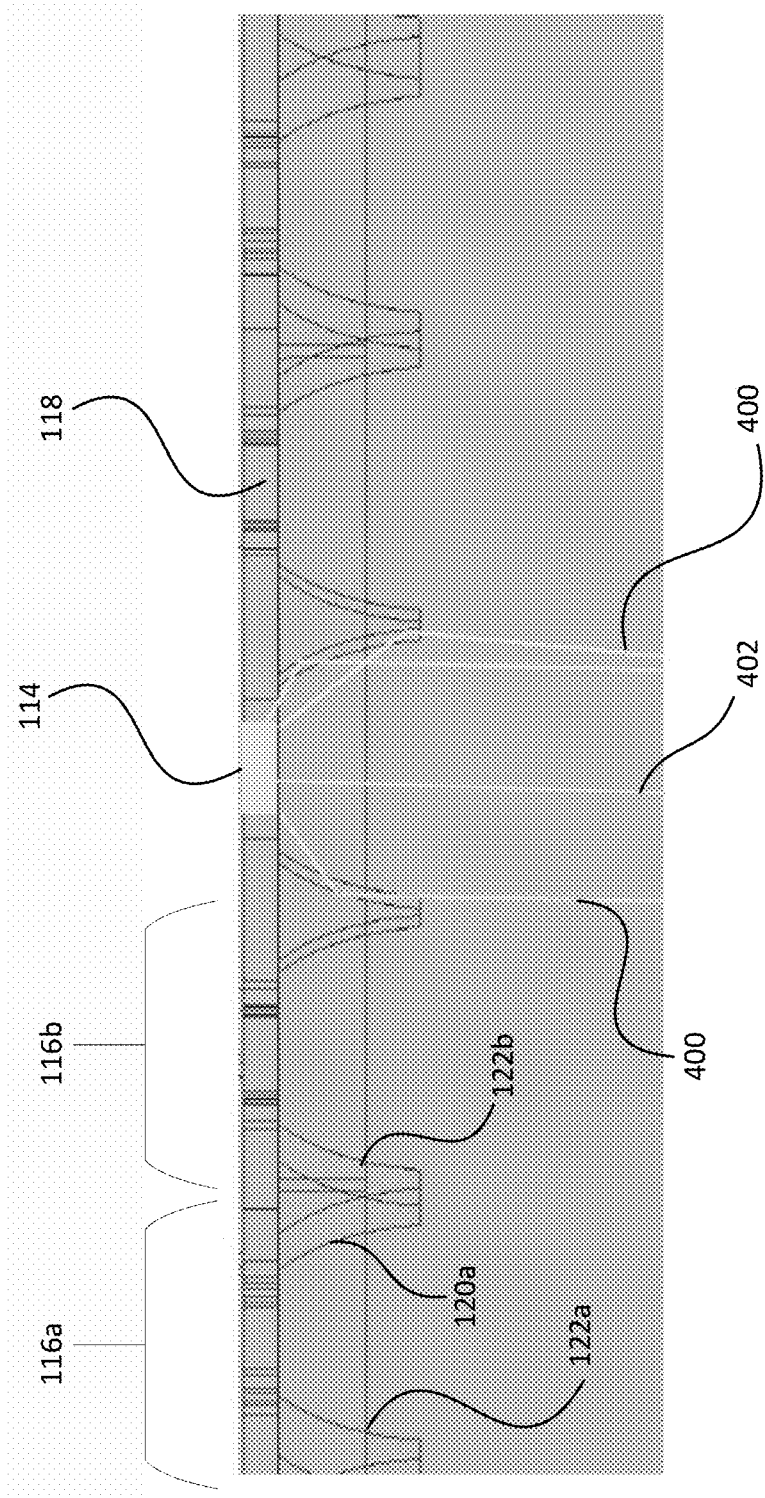
FIG. 3A is a side view of the anti-glare ring and an LED.
Figure 4:
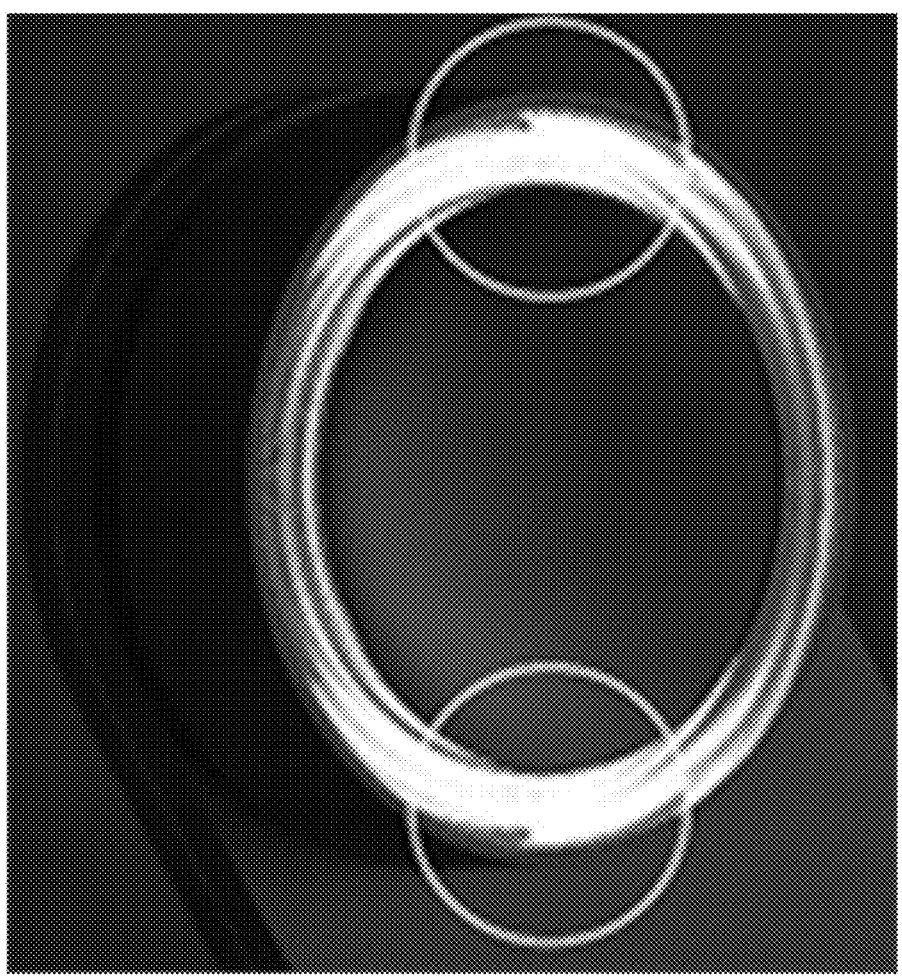
FIG. 4 illustrates a glare effect created by an embodiment of a luminaire that does not include an anti-glare ring.

FIG. 3 illustrates an embodiment of the anti-glare ring 108. Anti-glare ring 108 may include a number of reflectors 116 that are disposed along the periphery of the anti-glare ring 108 in a radial pattern. In some embodiments, the number of reflectors 116 may match the number and arrangement of LEDs 114 on the light engine 106 such that each LED 114 has a dedicated reflector 116. The anti-glare ring 108 may define an aperture 118 in a center of each of the reflectors 116. These apertures 118 allow light from the LEDs 114 to pass into a center of the reflectors 116. In some embodiments, a distal most portion of the LEDs 114 extend through a thickness of the anti-glare ring 108 and nest within the apertures 118 as best illustrated in FIG. 3A. In some embodiments, the reflectors 116 may be parabolic in shape, with each reflector 116 including a first side 120 and a second side 122 that oppose one another. Such a design enables the reflectors 116 to reflect tangentially-oriented light 400 emitted from the LEDs 114 and re-orients the light into a narrow beam of substantially parallel rays directed at the TIO 110, while light 402 emitted in a generally axially from the LEDs 114 passes between the sides 120, 122 of the reflectors 116 and directly to a refractive prism (described in greater detail in relation to FIG. 5D) of the TIO 110. In such a manner, the anti-glare ring 108 increases the light beam quality of the luminaire 100 by making the light beam more precise prior to entering into the refractive prism of TIO 110. This increases the comfort of the light by decreasing the glare effect of the luminaire 100. Without the anti-glare ring 108, the tangential light rays exit the TIO 110 too wide, which creates an uncomfortable glare effect as illustrated in FIG. 4.

Turning back to FIG. 3A, in some embodiments a portion of adjacent reflectors 116 may be formed as part of a single structure. For example, the first side 120a of one reflector 116a may be formed as part of a same upright structure as the second side 122b of another reflector 116b such that the adjacent reflectors 116 are positioned without gaps formed therebetween. Such an arrangement enables the LEDs 114 and reflectors 116 to be more tightly grouped to enhance the uniform visual effect produced by the luminaire 100. It will be appreciated that other arrangements of reflectors 116 that have the sides 120, 122 of adjacent reflectors 116 formed separately and/or spaced apart from one another along a circumference of the anti-glare ring 108. In some embodiments, the sides 120, 122 of each reflector 116 may extend beyond edges of LEDs 114 to enable the reflectors 116 to capture as much light from the LEDs 114 as possible. For example, as shown in FIG. 3, the apertures 118 are formed in the anti-glare ring 108 so as to not extend entirely to the vertical edges of the reflector sides 120, 122, ensuring that the LEDs 114 positioned within the apertures 118 also do not extend to the vertical edges of the reflector sides 120, 122. However, in other embodiments the apertures 118 and LEDs 114 may have substantially the same radial dimension as the reflector sides 120, 122. While illustrated with reflectors 116 having two distinct, opposing sides 120, 122, it will be appreciated that in some embodiments the anti-glare ring 108 may include reflector structures that extend about larger portions of the LEDs 114. As just one example, each reflector 116 may extend about more than two sides of an LED 114, possibly with up to 360 degrees of coverage. For example, each reflector 116 may be a parabolic dish-shape that extends around an entire periphery of the LED 114, enabling tangentially emitted light in all directions about the LED 114 to be re-oriented into the TIO 110.

Figure 5A:
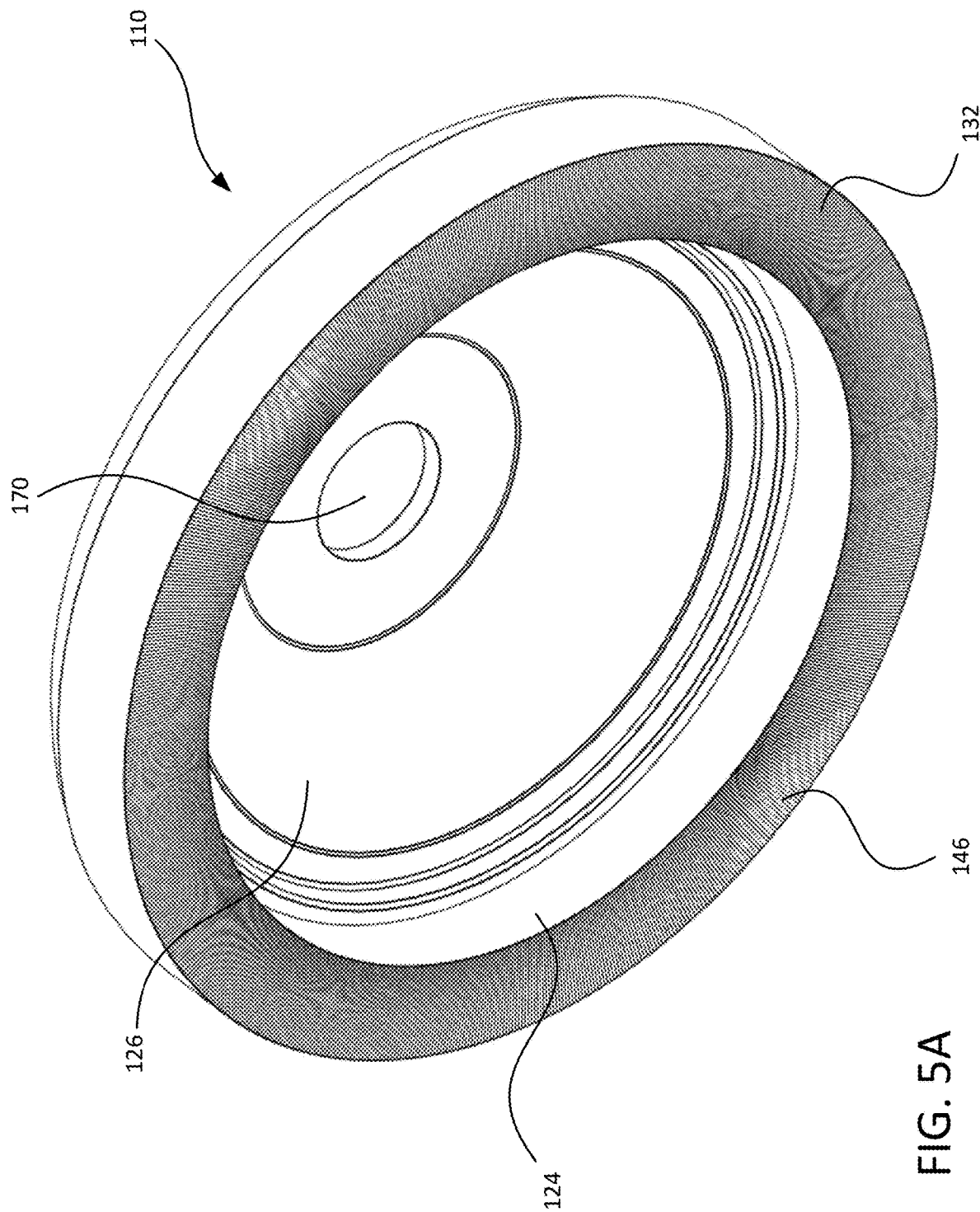
FIG. 5A is a bottom perspective view of a toroidal integrated optic (TIO), which is made up of a total internal reflectance (TIR) lens that is coupled with a light guide, according to embodiments.
Figure 5B:
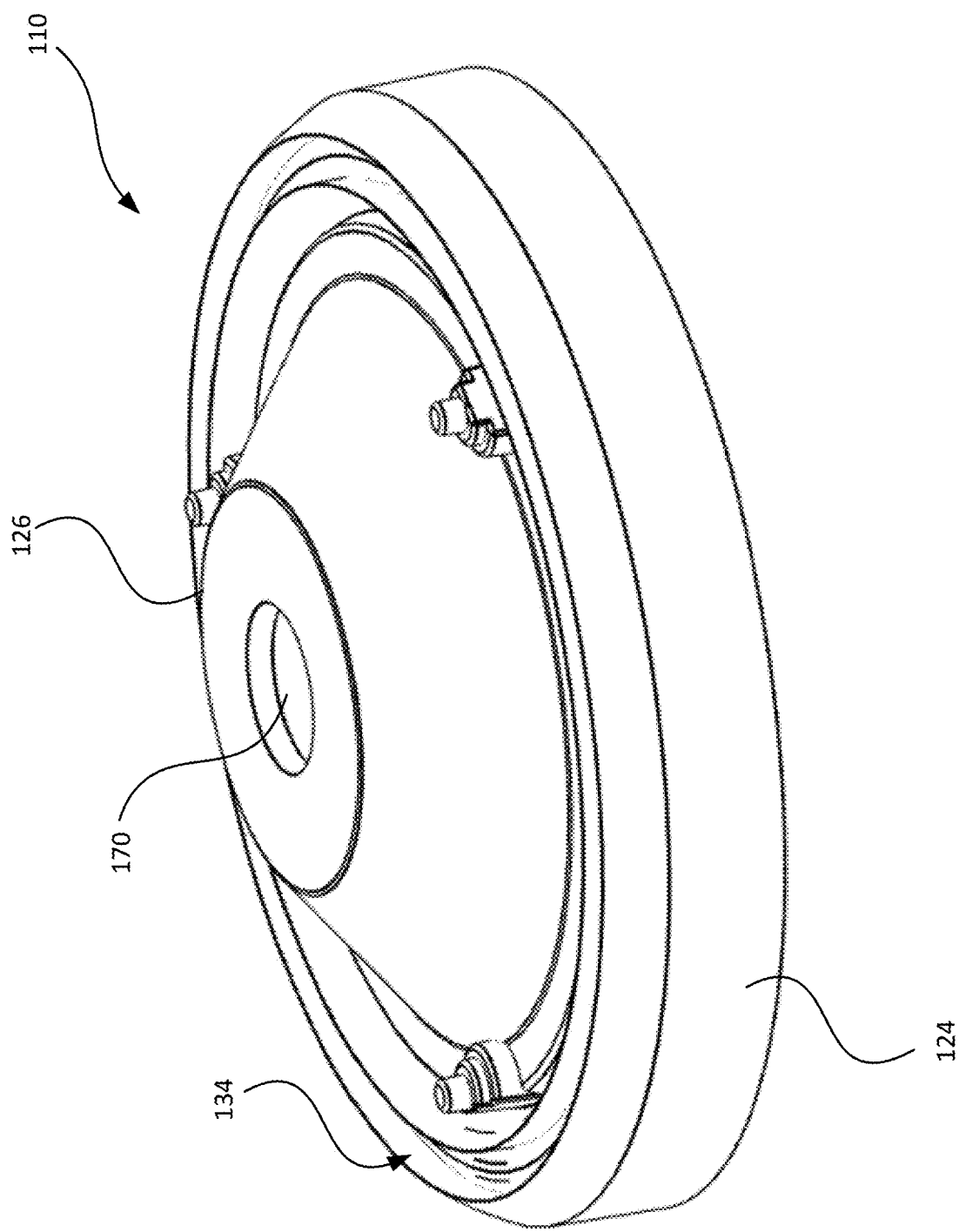
FIG. 5B is a top perspective view of the TIO of FIG. 5A.
Figure 5C:
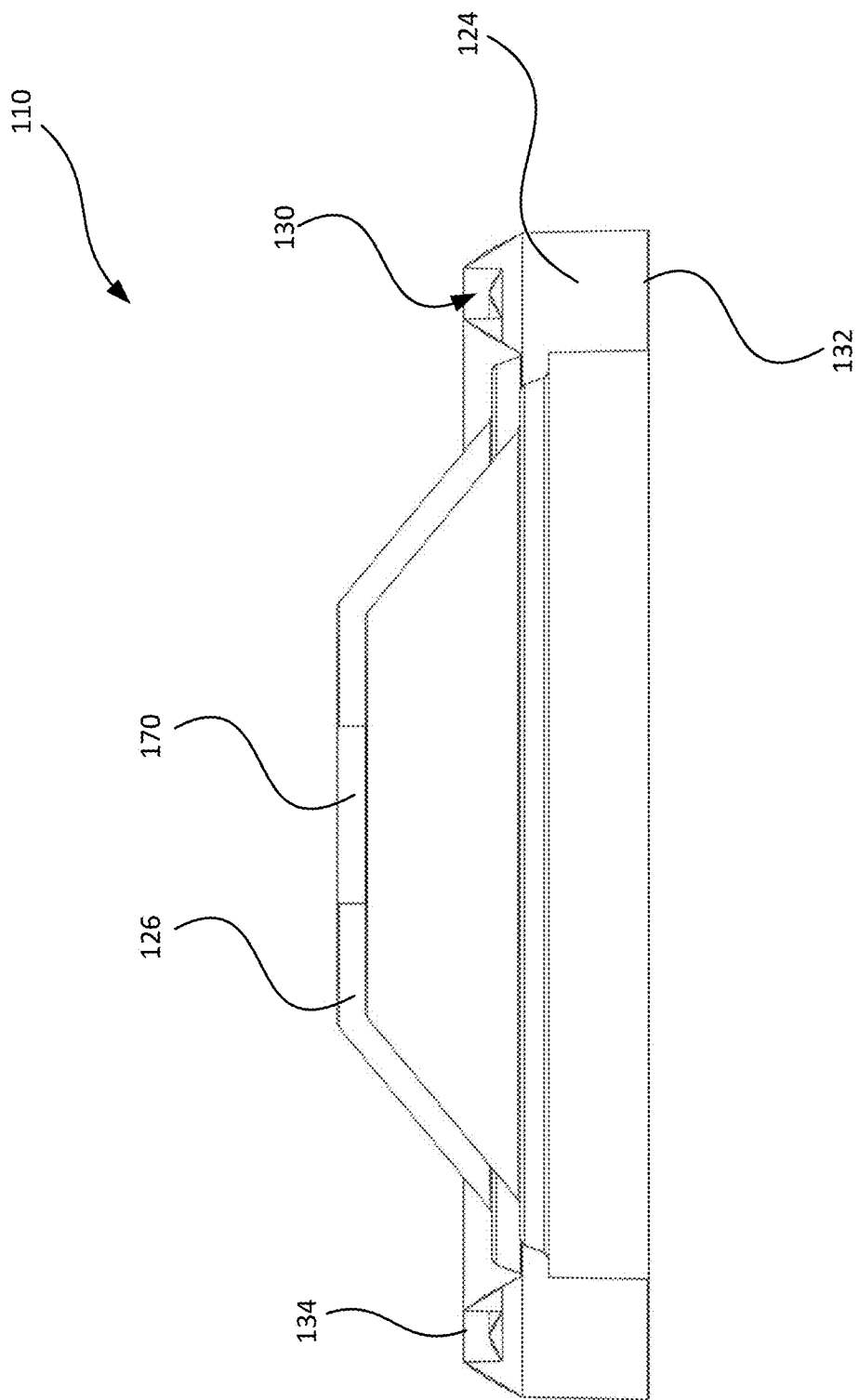
FIG. 5C is a cross-section view of the TIO of FIG. 5A.

FIGS. 5A-5E illustrate one embodiment of the TIO 110. As shown in FIGS. 5A-5C, TIO 110 has a toroidal-shaped lens portion 124 and a body portion 126 that extends within a center of the toroidal-shaped lens portion 124. In some embodiments, the body portion 126 may define an aperture 170 that allows the fastener 128 to pass through the TIO 110 and into the cover 112. While illustrated as being generally solid, other designs of the body portion 126 are possible. For example, the body portion 126 may include a hub that defines aperture 170, with spokes and/or other connecting structures that attach the hub to the toroidal-shaped lens portion 124.

Figure 5D:
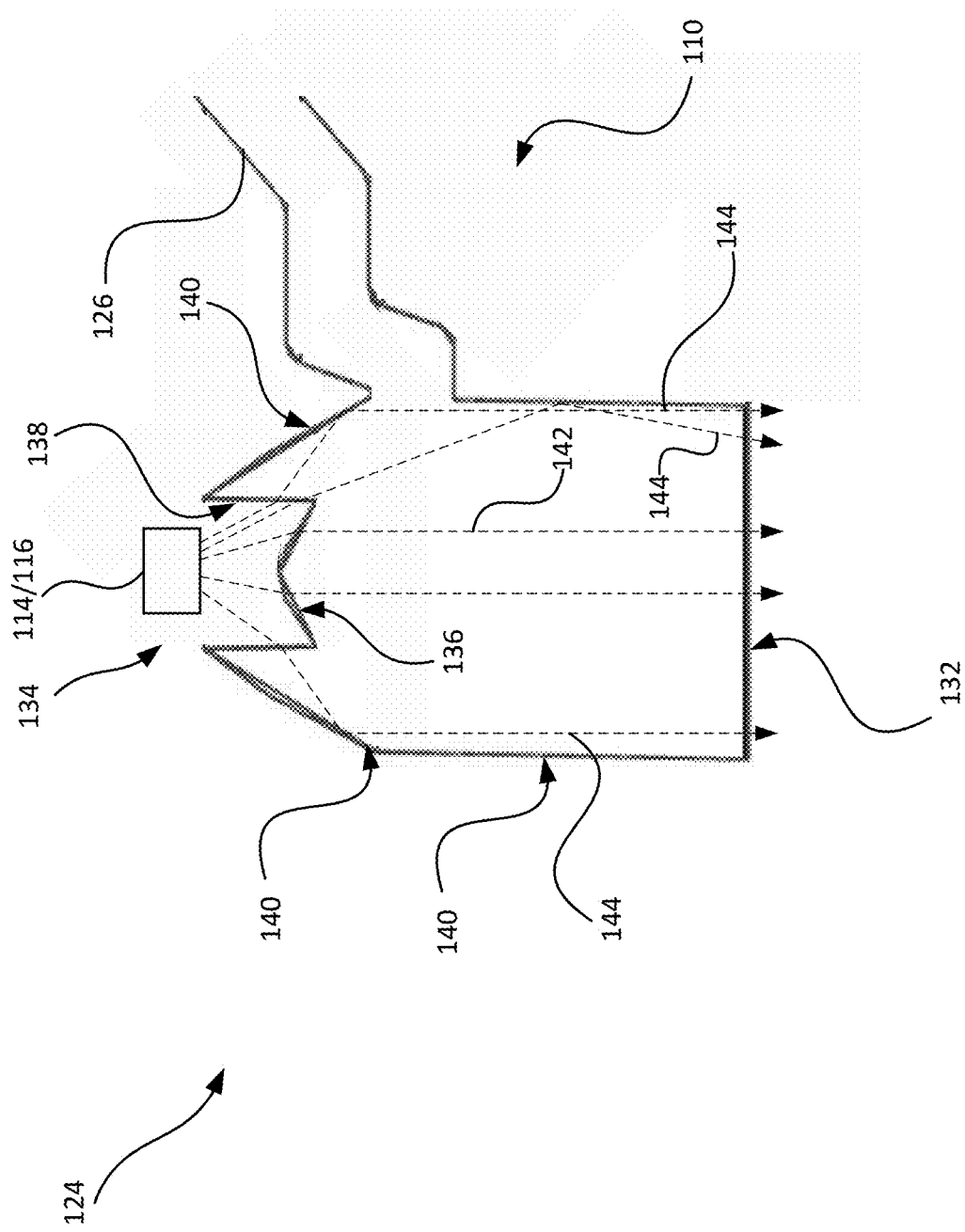
FIG. 5D is a cross-section view of the TIO of FIG. 5A.

The TIO 100 may have a total internal reflectance (TIR) cross-section that reflects high angle light and refracts low angle light, and may be coupled into a light guide. The lens portion 124 is formed as an approximately parabolic cross-sectional profile that has been rotated to form the toroidal-shaped TIO 110 that is symmetrical about a central axis of the TIO 110. For example, as best illustrated in FIGS. 5C and 5D, the lens portion 124 includes a light entrance side 130 and a light exit side 132, with reflective prism (second section of a collimator) 140 extending therebetween. The light entrance side 130 forms a channel 134 that extends annularly around the lens portion 124. The channel 134 includes a refractive prism (first section of the collimator) 136 and side walls that form side incidence surfaces 138. The LEDs 114 and/or reflectors 116 may be positioned within the channel 134 such that light emitted from the LEDs 114 and/or reflected by reflectors 116 is directed to the refractive prism 136 and side incidence surfaces 138 of the TIO 110. For example, as shown in FIG. 5D, the refractive prism 136 may have a dome-like shape (with straight and/or curved surfaces) and may receive first rays 142 of the light emanating from the LEDs 114 and/or reflectors 116 that is aligned with and/or substantially aligned with an optical axis of the TIO 110 and refracts and focuses rays emitted from around an optical axis of each LED 114 into rays 142 that are parallel with or substantially parallel with a collimation axis of the TIO 110. Each side incident surface 138 is configured to receive second rays 144 of light that is emitted from the LEDs 114 and/or reflectors 116 off-axis relative to the optical axis of the TIO 110. The side incident surfaces 138 are configured to direct light to the reflective prism 140, which then utilize principles of total internal reflection to re-orient the light into a direction that is parallel with or substantially parallel with a collimation axis of the TIO 110, with a light beam emitted from the light exit side 132 has a beam angle of between about 15 and 60 degrees, oftentimes approximately 30 degrees. In the present embodiment, total internal reflection occurs when a ray of light strikes the reflective prism 140 at an angle larger than some critical angle with respect to the normal of the reflective prism 140, where the critical angle is equal to the arcsin of the refractive index of air/the refractive index of the reflective prism 140. If the refractive index is lower on the other side of the boundary, no light can pass through, so effectively all of the light is reflected. To achieve this reflection, the reflective prism 140 has a smooth surface that provides a uniform interface between the TIO 110 and the air. When the angle of incidence of rays hitting the reflective prism 140 exceed the critical angle, the light is reflected into the lens material and generally along the collimator direction of the TIO 110.

Figure 5E:
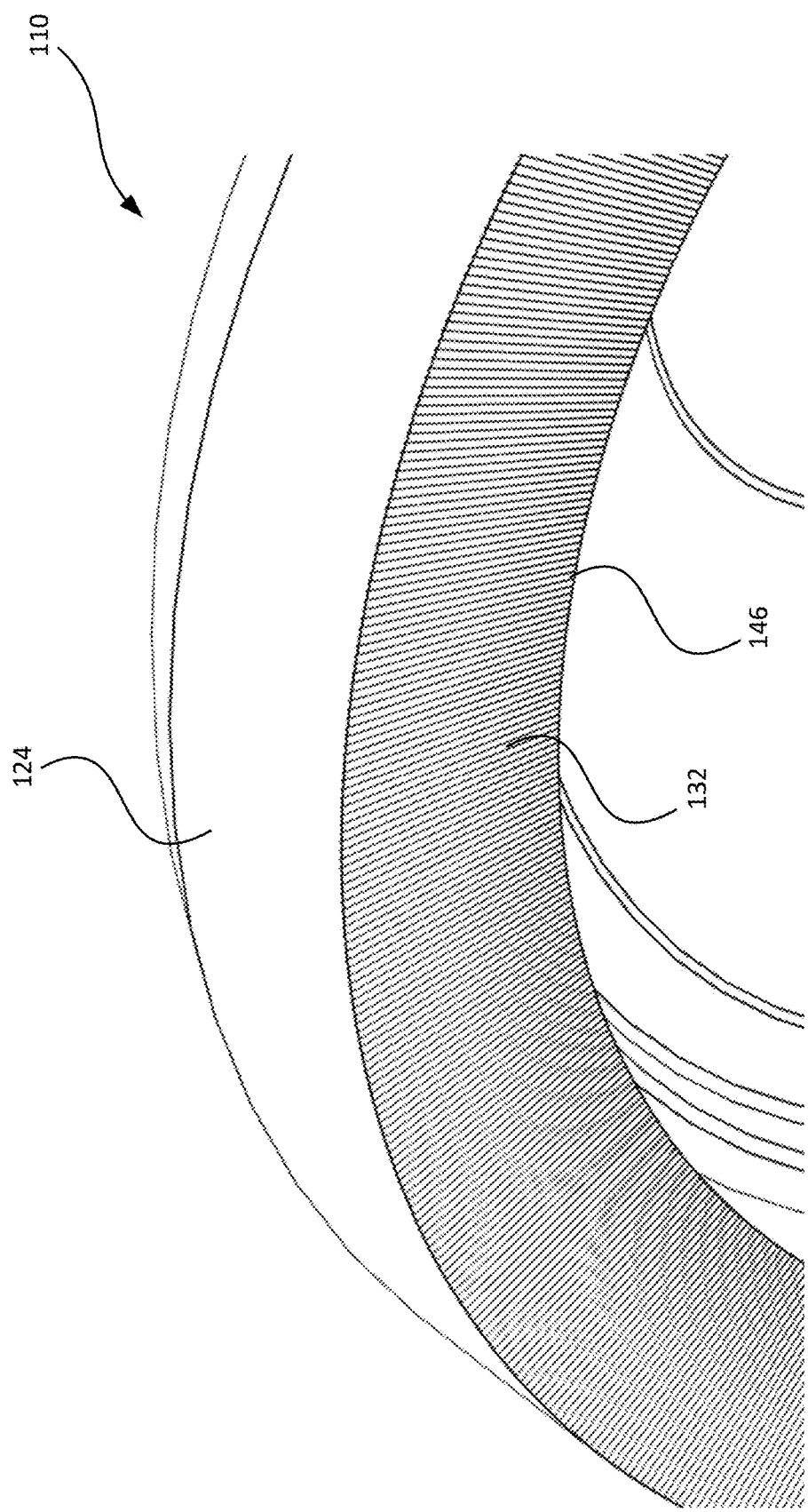
FIG. 5E is a sectional view of the TIO of FIG. 5A.

In some embodiments, the light exit side 132 of the TIO 110 may include a diffusing surface. For example, as shown in FIGS. 5A and 5E, the light exit side 132 may include a lenticular feature 146 that produces a refracting effect (diffusing the visibility of the LED point sources, but optically "stretching" the light tangentially in a controlled manner) that helps blend the light emitted from the TIO 110 to produce a visually uniform halo of light. This may be done by using a rough or otherwise textured lenticular feature 146 that causes light rays emitted from the TIO 110 to spread out among a variety of angles based on how the light impacts each location of the rough surface. For example, in some embodiments, the lenticular feature 146 may include lenticular grooves formed from small cylindrical shapes that are radially stacked next to one another. This radial pattern of cylindrical shapes may produce radially extending ridges. In some embodiments, the ridges may be generally U-shaped in cross-section, with parabolic, v, and/or u-shaped troughs disposed between adjacent ridges. In some embodiments, these troughs may be between about 0.25 and 0.75 mm in depth, most commonly between about 0.40 and 0.60 mm in depth. These ridges and troughs provide a roughened surface that can diffuse light emitted from the TIO 110. While described with radially disposed ridges and troughs, other depths and/or shaped of lenticular features 146 may be utilized in some embodiments. In some embodiments, the lenticular features are radially arranged ridges having convex round outer profiles.

Figure 6A:
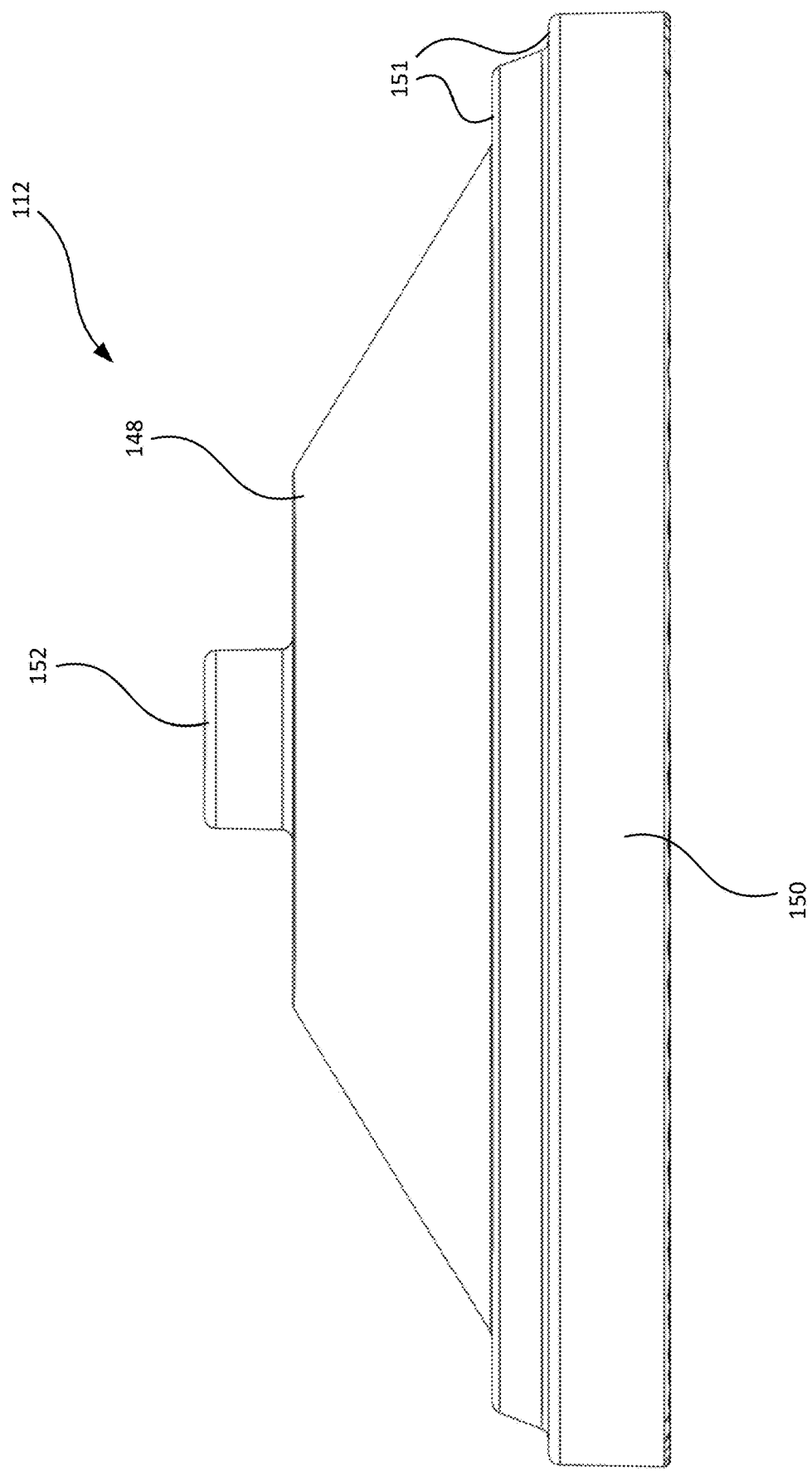
FIG. 6A is a side view of a luminaire cover according to embodiments.
Figure 6B:
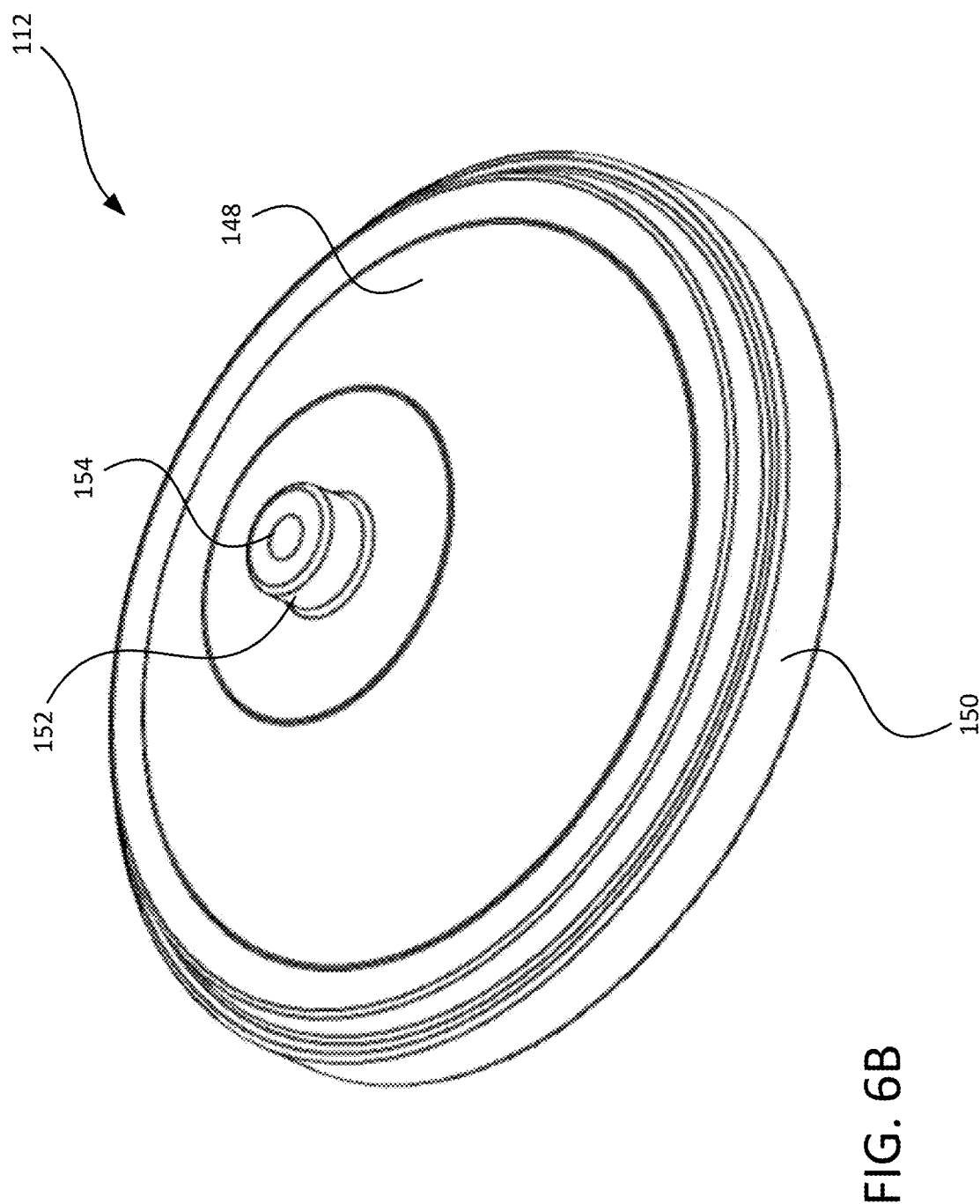
FIG. 6B is a top perspective view of the cover of FIG. 6A.
Figure 6C:
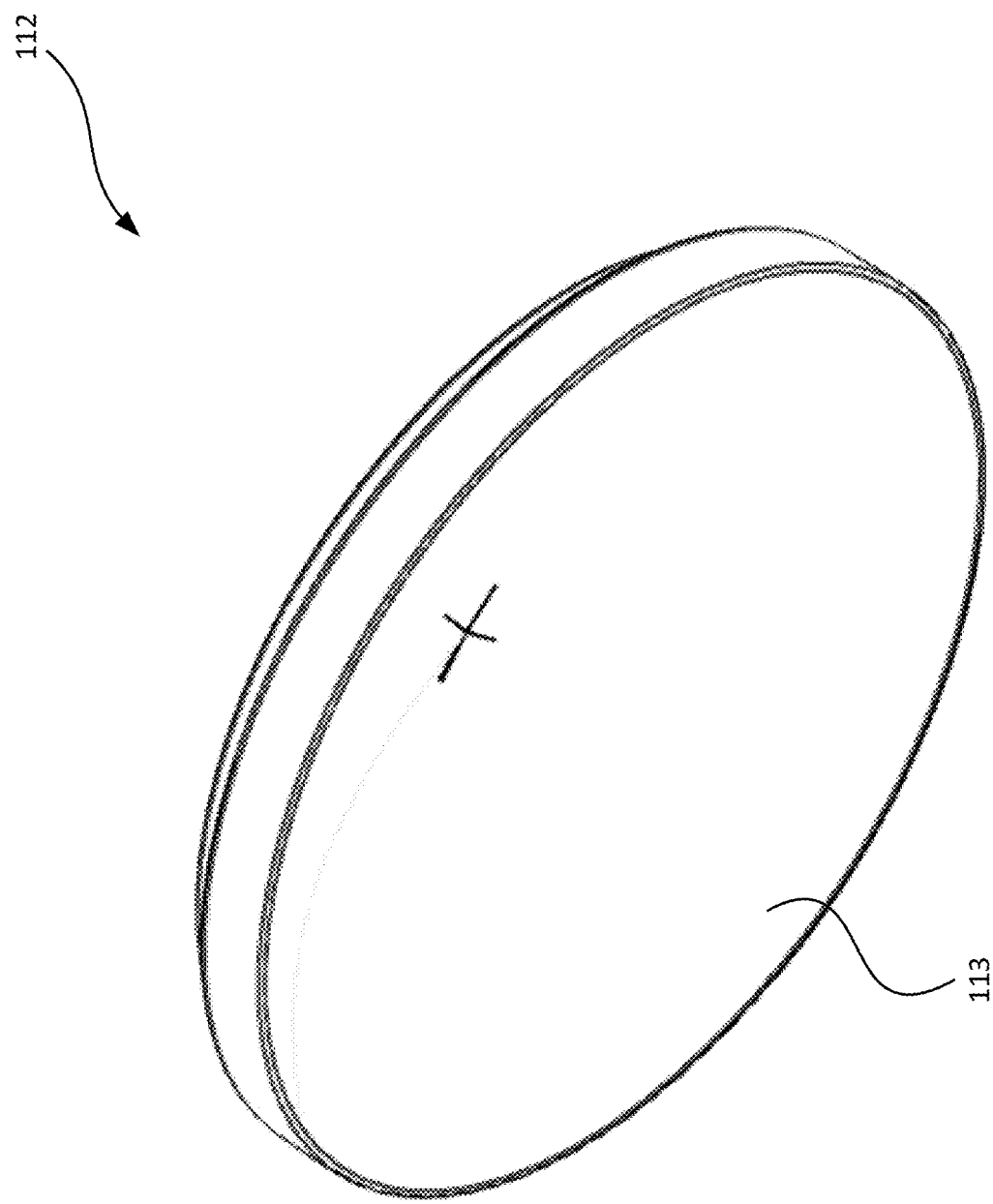
FIG. 6C is a bottom perspective view of the cover of FIG. 6A.

FIGS. 6A-6D illustrate the cover 112 of the luminaire 100. The cover 112 may be configured to nest within an interior of the TIO 110, with a main body of the cover 112 being positioned within the toroidal lens portion 124. To achieve this nesting, the cover 112 may have a top surface that is designed to match or be similar in shape to the body portion 126 of the TIO 110. As illustrated in FIG. 6A, the cover 112 includes an upper portion 148 that has a conical frustum shape. A lower portion 150 of the cover 112 may include stepped features 151 that are configured to rest against sections of the mounting portion 126 that are proximate the toroidal lens portion 124. In some embodiments, an outward most portion of the stepped features 151 may rest against and/or be proximate an interior TIR surface 140. As best illustrated in FIGS. 6B and 6C, the cover 112 may also include a mating portion 152 that is configured to couple the cover 112 with the remaining components of the luminaire 100. As just one example, the mating portion 152 may protrude outward from the upper portion of the cover 112 and define a threaded aperture 154. The mating portion 152 may be configured to be inserted through the aperture 170 formed within the mounting portion 126 of the TIO 110. The threaded aperture 154 may then receive an end of the fastener 128. As illustrated in FIG. 1C, the fastener 128 may be inserted through the base 102 and through central apertures formed in each of the light engine 106, anti-glare ring 108, and TIO 110 and may be secured within the threaded aperture 150 of the mating portion 152. Once tightened, the fastener 128 and cover 112 operate to secure the internal components (e.g., the light engine 106, anti-glare ring 108, and TIO 110) within the interior 104 of the base 102 to form an assembled luminaire 100.

Figure 6D:
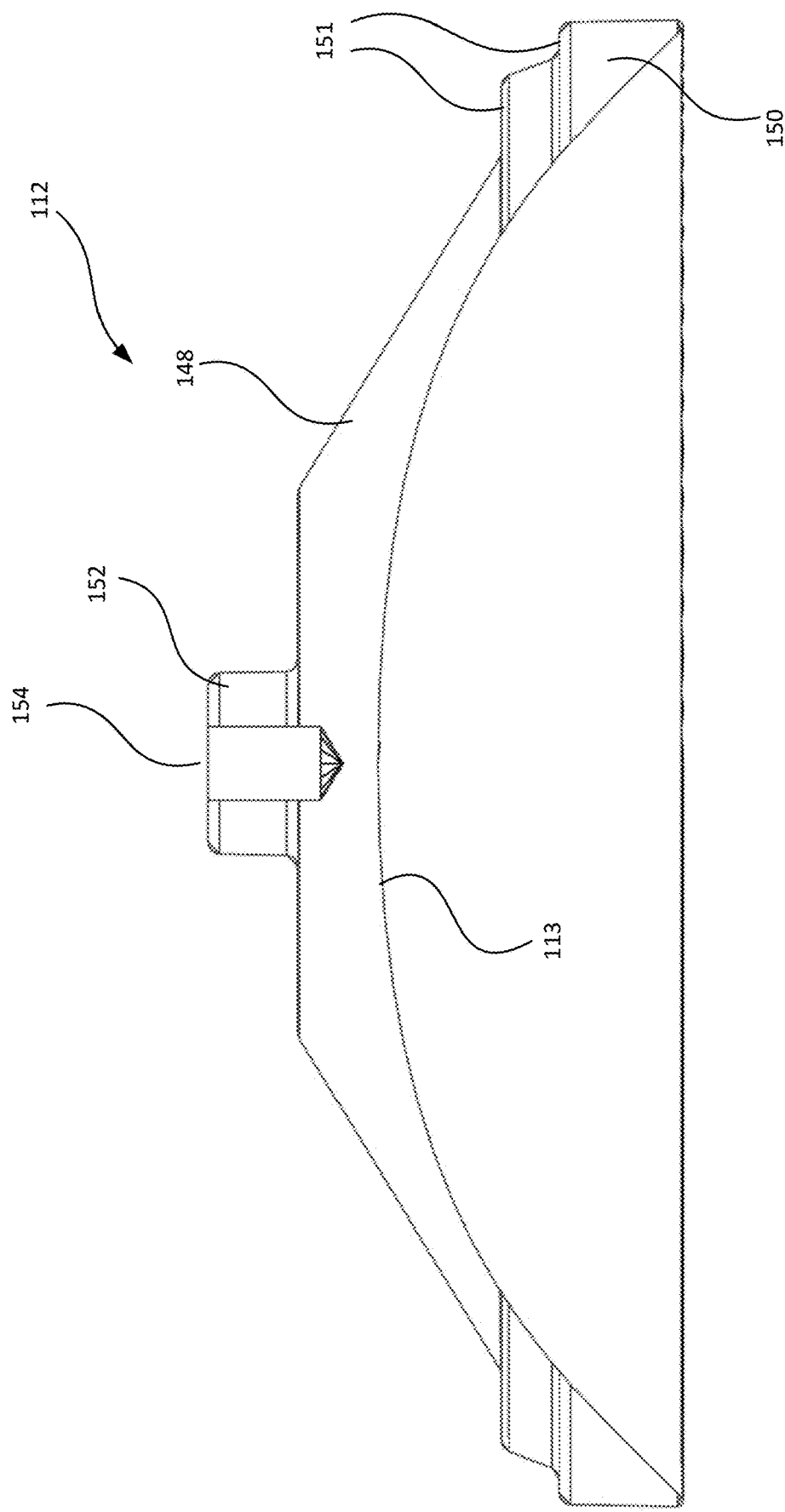
FIG. 6D is a side cross-section of the cover of FIG. 6A.

Turning now to FIGS. 6C and 6D, a face of the cover 112 that is exposed when coupled with the base 102 may include an inverted dome shape. In some embodiments, the face 113 of the cover may be flat, dome-shaped, and/or have some other profile. Oftentimes, the face 113 may have a uniform and/or symmetrical pattern for aesthetic purposes, however some embodiments may utilize an irregularly shaped and/or colored cover 112. Additionally, some embodiments may utilize a cover 112 that contrasts with a color of the TIO 110 and/or light emitted from the luminaire 100, while other embodiments have covers 112 that match or significantly match the color of the TIO 110 and/or light emitted from the luminaire 100.

FIGS. 7A-7E illustrate an embodiment of the base 102. In embodiments where the base 102 is used as a heatsink, the base 102 may be formed from a conductive metal such as, but not limited to, copper or aluminum. The base 102 may be generally cylindrical in shape and may define open interior 104. The open interior 104 may be sized and shaped to receive the light engine 106, anti-glare ring 108, TIO 110, and cover 112. For example, the open interior 104 may include a lower portion 155 that is generally cylindrical in shape that is configured to receive the toroidal lens portion 124, as well as the light engine 106 and anti-glare ring 108. An upper portion 156 of the open interior 104 may taper upward in a generally conical frustum shape to receive the mounting portion 126 of the TIO 110 and the mating portion 152 of the cover 112. The upper portion 156 may further define a central aperture 158 that is configured to receive fastener 128 to allow the various components of the luminaire 100 to be secured within the interior 104 of the base 102. In some embodiments, a top end of the central aperture 158 may include a countersink 160 such that a top surface of the fastener 128 may be substantially flush with or sunk into a top surface 162 of the base 102 as best illustrated in FIG. 1C. In such embodiments, the top surface 162 may include a protrusion 164 that includes the central aperture 158 to provide sufficient room and material for formation of countersink 160. In some embodiments, both with and without the countersink 160, the top surface 162 may be generally flat. In some embodiments, a thickness of the top surface may be increased to accommodate the countersink 160.

The base 102 may also include an aperture 172 that is positioned to receive wiring for the light engine 106 of the luminaire 100. Oftentimes, the aperture 172 may be positioned within an upward facing surface of the base 102, allowing the wiring to extend downward from a structure on which the luminaire 100 is mounted. This not only allows the wiring to be shorter and more directly routed into the luminaire 100 and light engine 106 from the structure, but also helps enable the wiring to be covered up by the base 102 such that the wiring is not visible when the luminaire 100 is mounted to the structure. Additionally, by securing the wire though the aperture 172 formed in the upward facing surface of the base 102, the wiring may help support the luminaire 100 when unmounted from the structure, preventing the luminaire 100 from falling if a coupling between the luminaire 100 and the structure is disconnected for any reason. In some embodiments, the aperture 172 may positioned off-center of the base 102. This leaves the center portion of the base 102 available for aperture 158 to receive one or more fasteners (such as fastener 128) to couple the components of the luminaire 100 together and/or for the base 102 (and entire luminaire 100) to be mounted to a structure. Additionally, the off-center alignment off the aperture 172 allows the aperture 172 to be generally aligned with a connector of the annularly-shaped light engine 106.

Figure 7A:
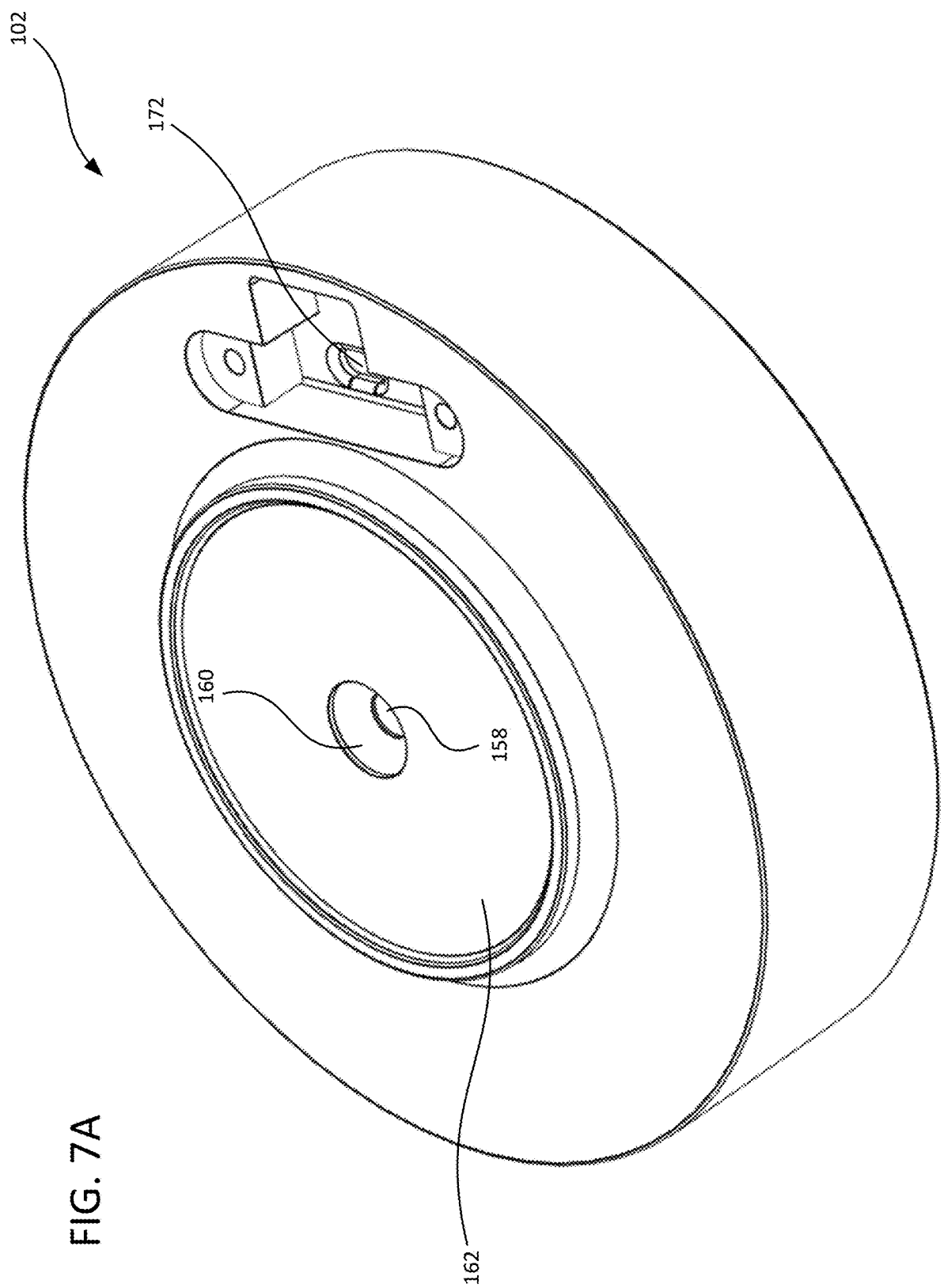
FIG. 7A is a top perspective view of a luminaire base according to embodiments.
Figure 7B:
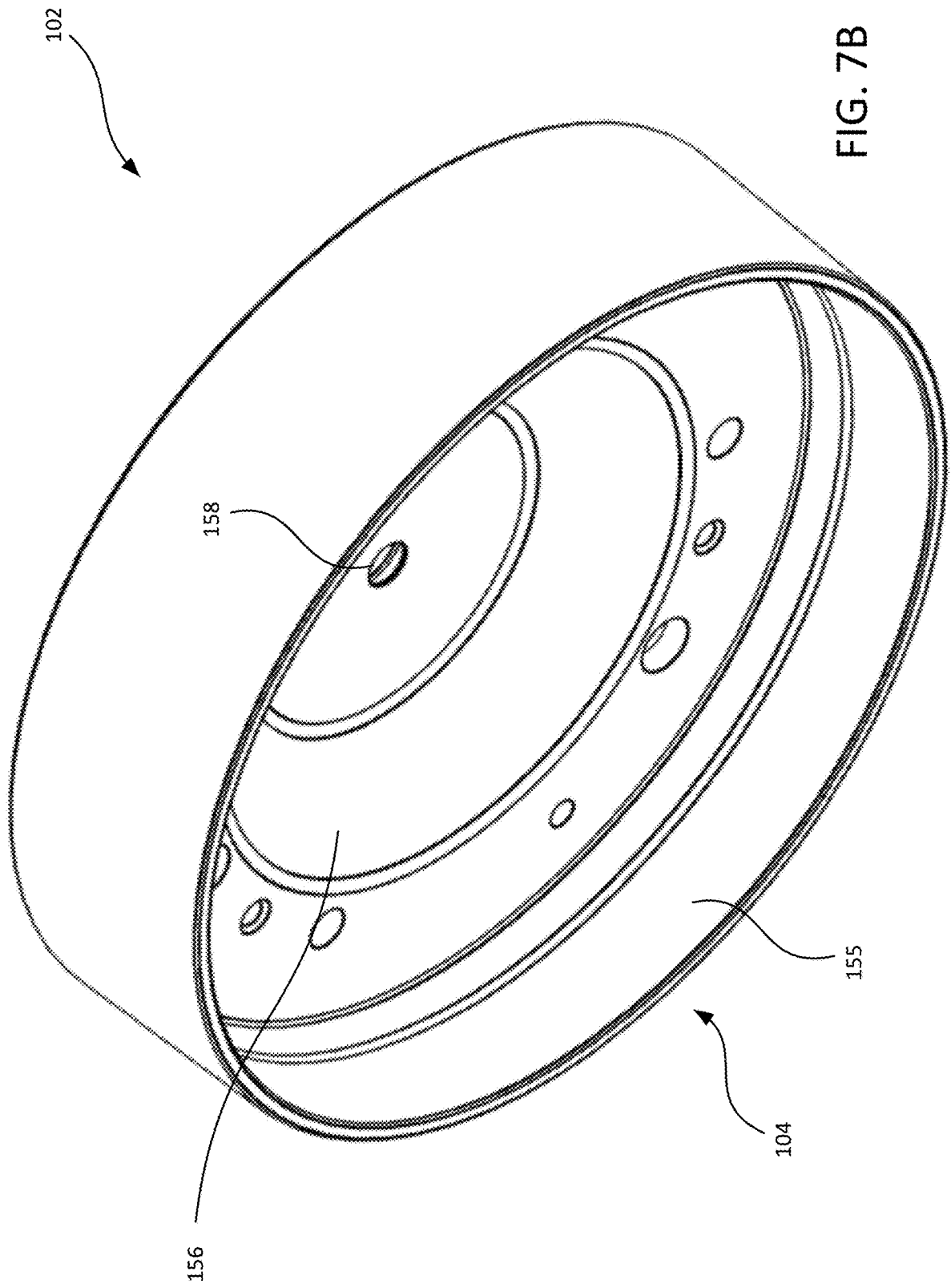
FIG. 7B is a bottom perspective view of the base of FIG. 7A.
Figure 7C:
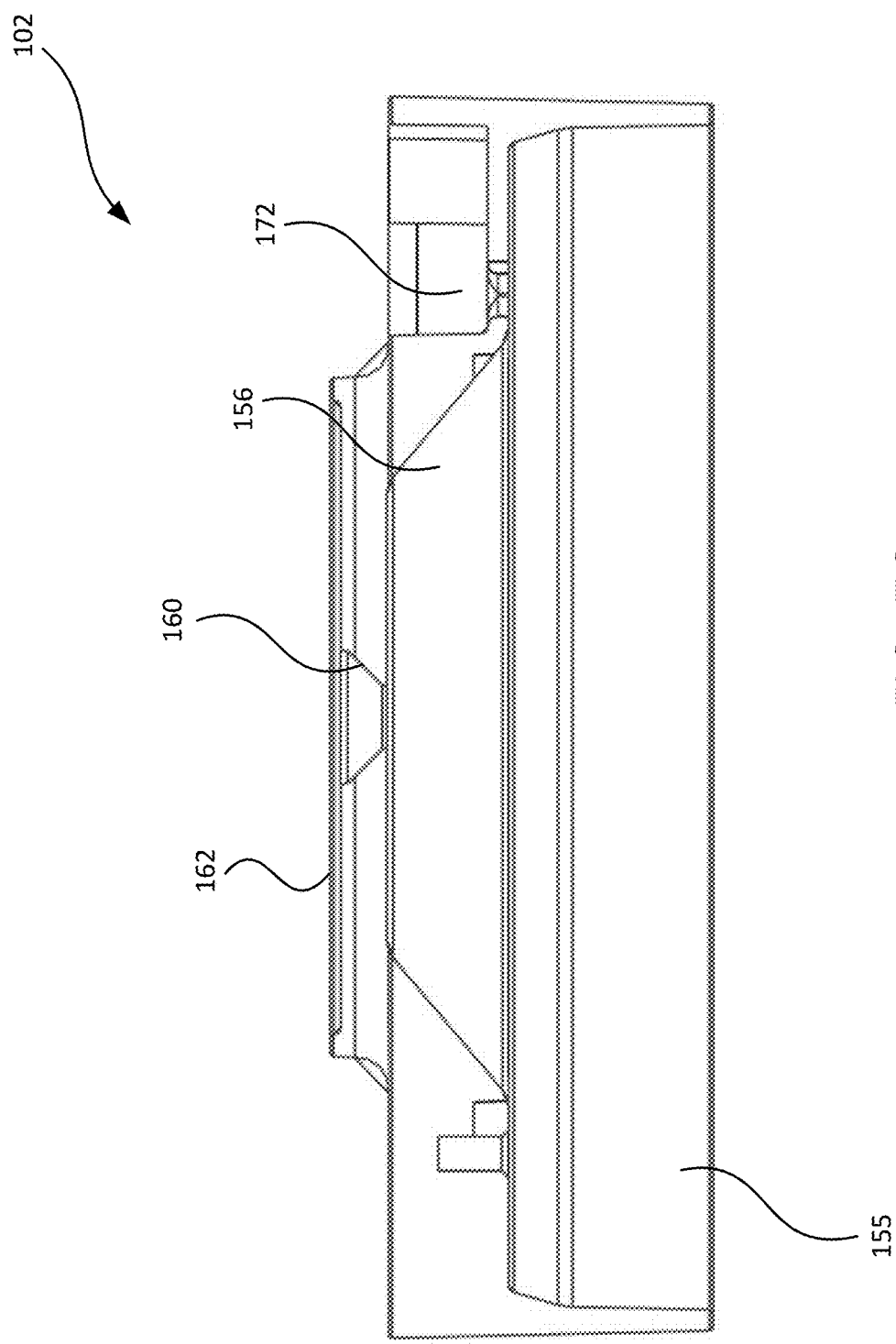
FIG. 7C is a side cross-sectional view of the base of FIG. 7A.
Figure 7D:
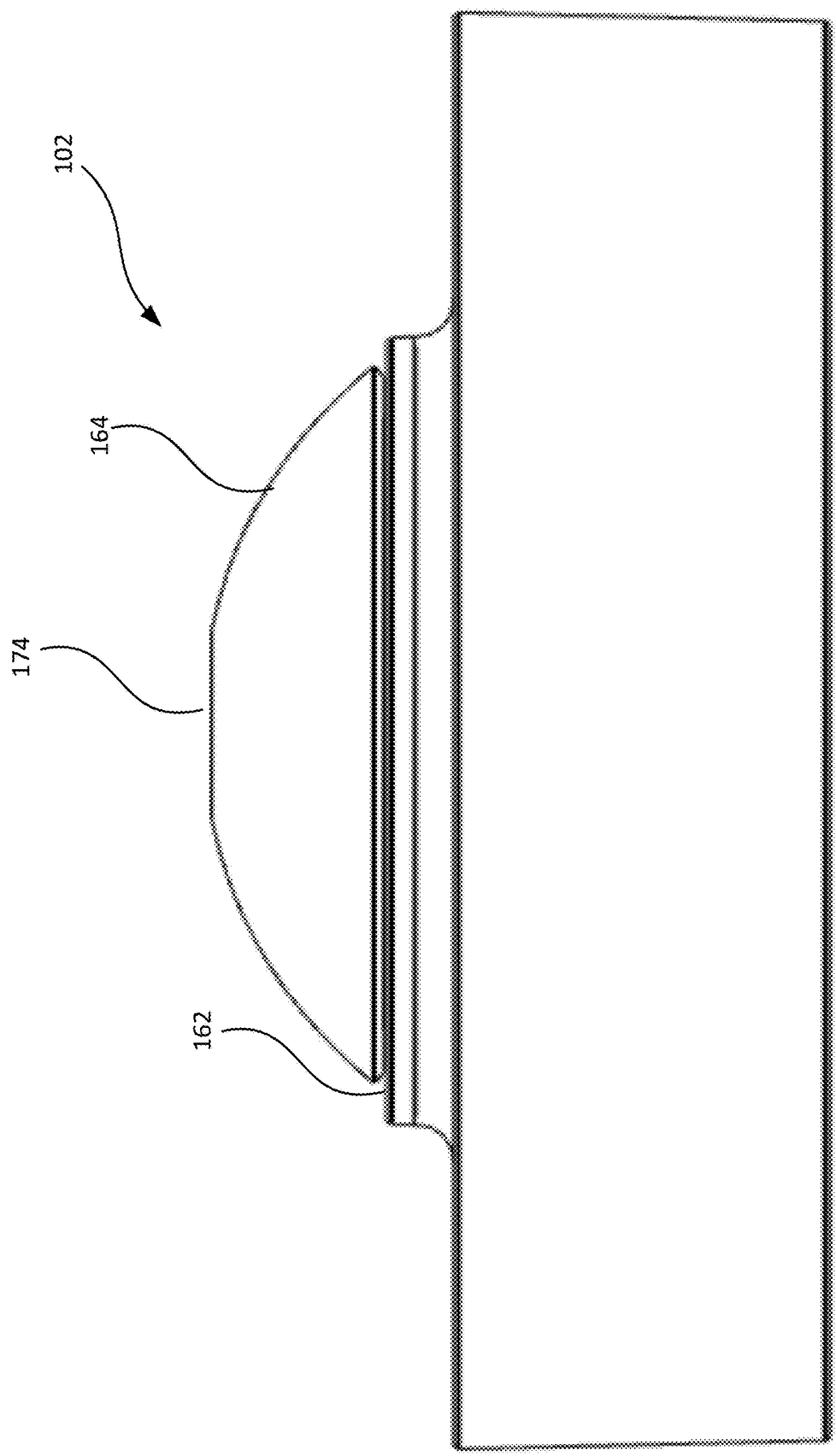
FIG. 7D is a side view of the base of FIG. 7A that includes a domed structure according to embodiments.
Figure 7E:
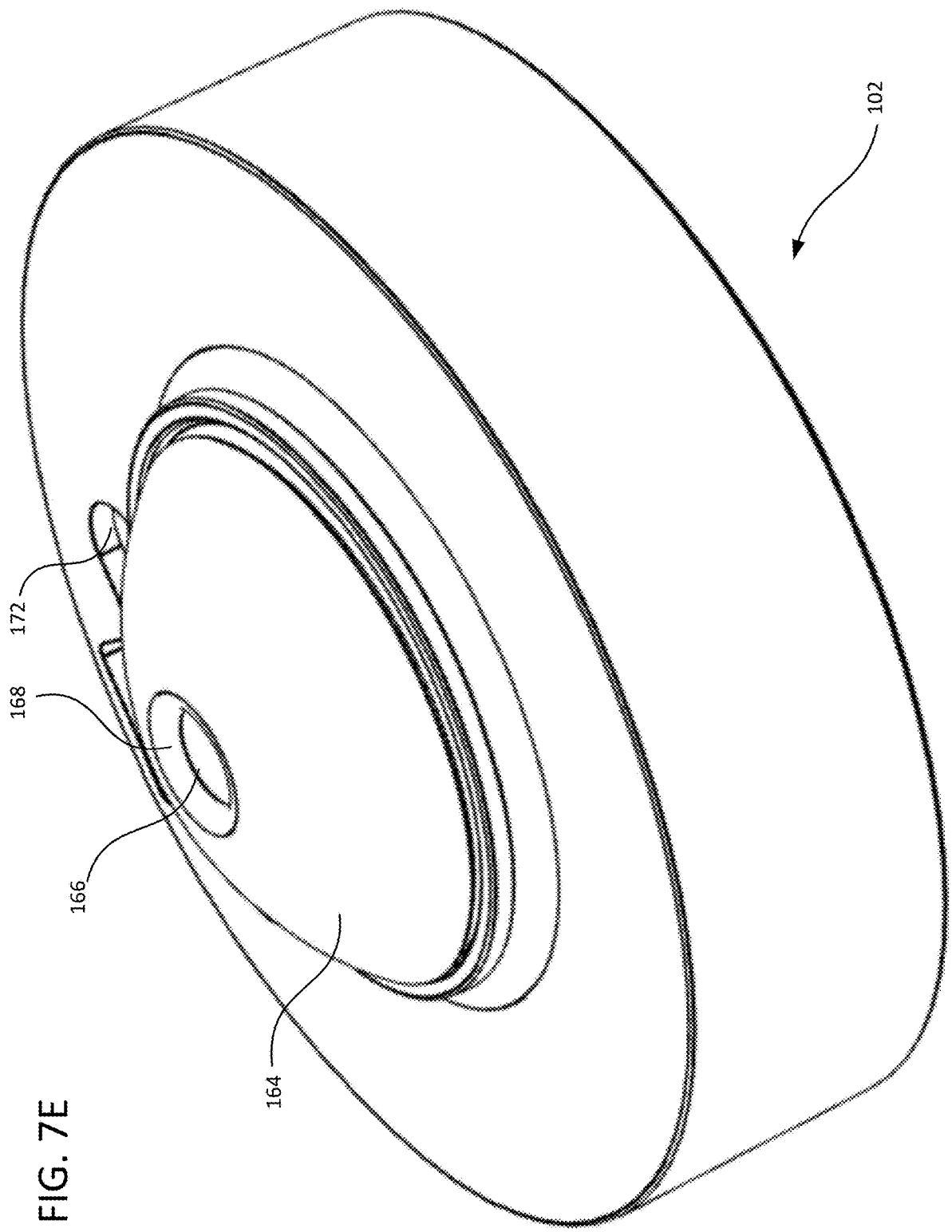
FIG. 7E is a perspective view of the domed structure of FIG. 7D.
Figure 8:
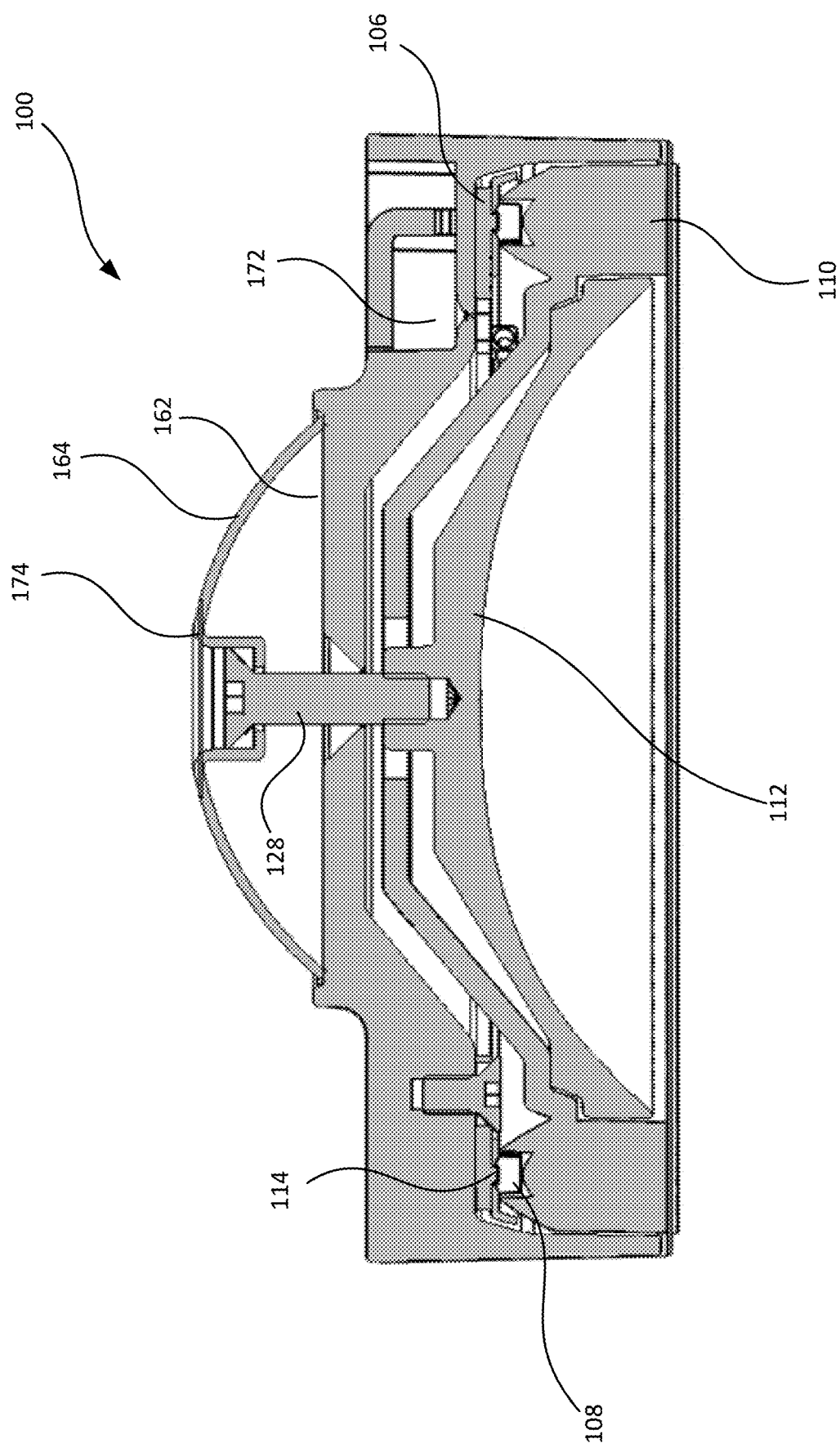
FIG. 8 is a side cross-sectional view of a luminaire having a domed structure according to embodiments.

In some embodiments, the base 102 may include a domed structure 164 that may be coupled with and/or formed as part of the top surface 162 as shown in FIGS. 7B-7D. For example, as illustrated in FIG. 8 the domed structure 164 may be secured to the base 102 using a fastener, such as fastener 128. In some embodiments, a single fastener 128 may be used to secure the domed structure 164, base 102, light engine 106, anti-glare ring 108, TIO 110, and/or cover 112 together such as illustrated in FIG. 8. In such embodiments, the domed structure 164 may define a central aperture 166 that is configured to receive the fastener 128. In other embodiments, one or more different fasteners and/or other coupling techniques (welding, rivets, adhesives, etc.) may be used to secure the domed structure 164 with the base 102. Turning back to FIG. 7E, the central aperture 166 may include a countersink 168 that allows a head of a fastener to be recessed within a top surface of the domed structure 164.

This enables the top surface of the domed structure 164 to be relatively smooth, allowing the domed structure 164 to be easily pivoted when engaged with another structure (such as a mounting device) which enables the luminaire 100 to be aimed in various directions. In some embodiments, a top section 174 of the domed structure 164 (such as an area surrounding the central aperture 166) may be generally flat, as best illustrated in FIG. 7D. This flattened top section 174 may allow the luminaire 100 to be quickly aligned with a support structure of a fixture so as to direct the luminaire directly downward.

Figure 9:
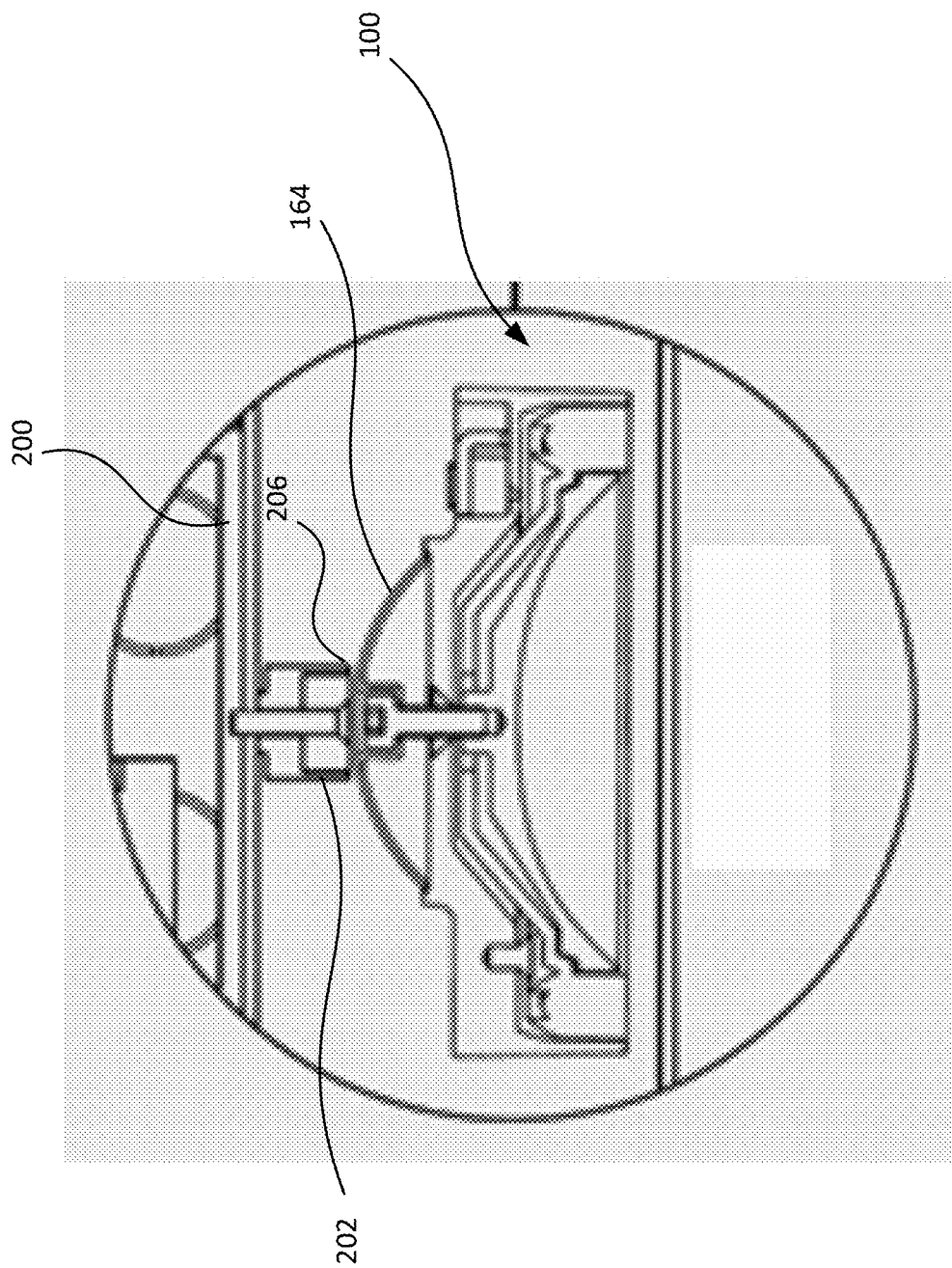
FIG. 9 is a side cross-sectional view of a luminaire coupled with a fixture via a magnetic element according to embodiments.

In some embodiments, the domed structure 164 may be formed from and/or otherwise include a ferromagnetic material. This allows the luminaire 100 to be mounted to a fixture or other structure using one or more magnets that are secured to the fixture. As illustrated in FIG. 9, a supporting fixture 200 may include a magnetic element 202 that is used to secure the luminaire 100 to the fixture 200. The fixture 200 may be a light housing, a ceiling, a mount, and/or other structure on which a luminaire 100 may be affixed. The magnetic element 202 may be formed entirely from one or more magnets (such as, but not limited to a ceramic magnet, alnico magnet, samarium cobalt magnet, neodymium, etc.) and or may have a magnetic material secured within an interior and/or on an exterior of the magnetic element 202. The magnetic element 202 may be formed as part of the fixture 200 or be later coupled with the fixture 200. For example, as illustrated here, the magnetic element 202 is coupled with the fixture 200 using a fastener 204. In some embodiments, the magnetic element 202 may define an open interior that receives the fastener 204 and that provides space to receive a portion of the domed structure 164 of the luminaire 100. For example, the magnetic element 202 may have a bottommost end 206 that defines a circular opening that can receive a portion of the domed structure 164 with the top surface of the domed structure 164 being flush or substantially flush with edges of the bottommost end 206. This allows an orientation of the luminaire 100 to be adjusted by pivoting, sliding, and/or otherwise maneuvering the domed structure 164 about the bottommost end 206 of the magnetic element 202. In embodiments in which the domed structure 164 includes a flattened top section 174, the flattened top section 174 may be larger than the bottommost end 206 of the magnetic element 202. This allows the bottommost end 206 to be readily aligned with the flattened top section 174 of the domed structure 164, which orients the luminaire directly downward relative to the magnetic element 202. Using magnetic couplings such as those described above may allow the luminaire 100 to be fully removed from the fixture 100 by pulling the domed structure 164 out of magnetic engagement with the magnetic element 202. In some embodiments, in addition to coupling the luminaire 100 with the fixture 200, wiring from the structure in which the fixture 200 is located may help secure the luminaire 100 with the fixture 200 and/or other structure. This may be particularly useful if a user accidentally pulls the domed structure 164 out of magnetic engagement with the magnetic element 202, as the wire may prevent the luminaire 100 from falling.

Figure 10:
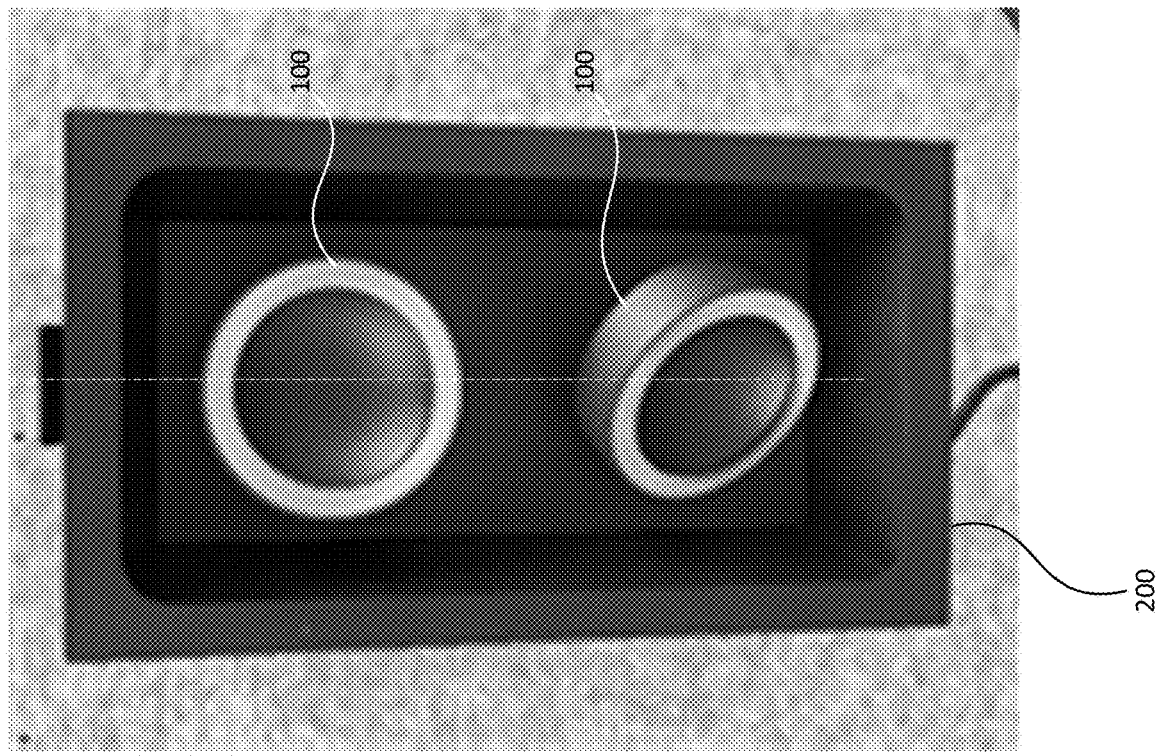
FIG. 10 illustrates a fixture having multiple magnetically mounted luminaires according to embodiments.
Figure 11A:
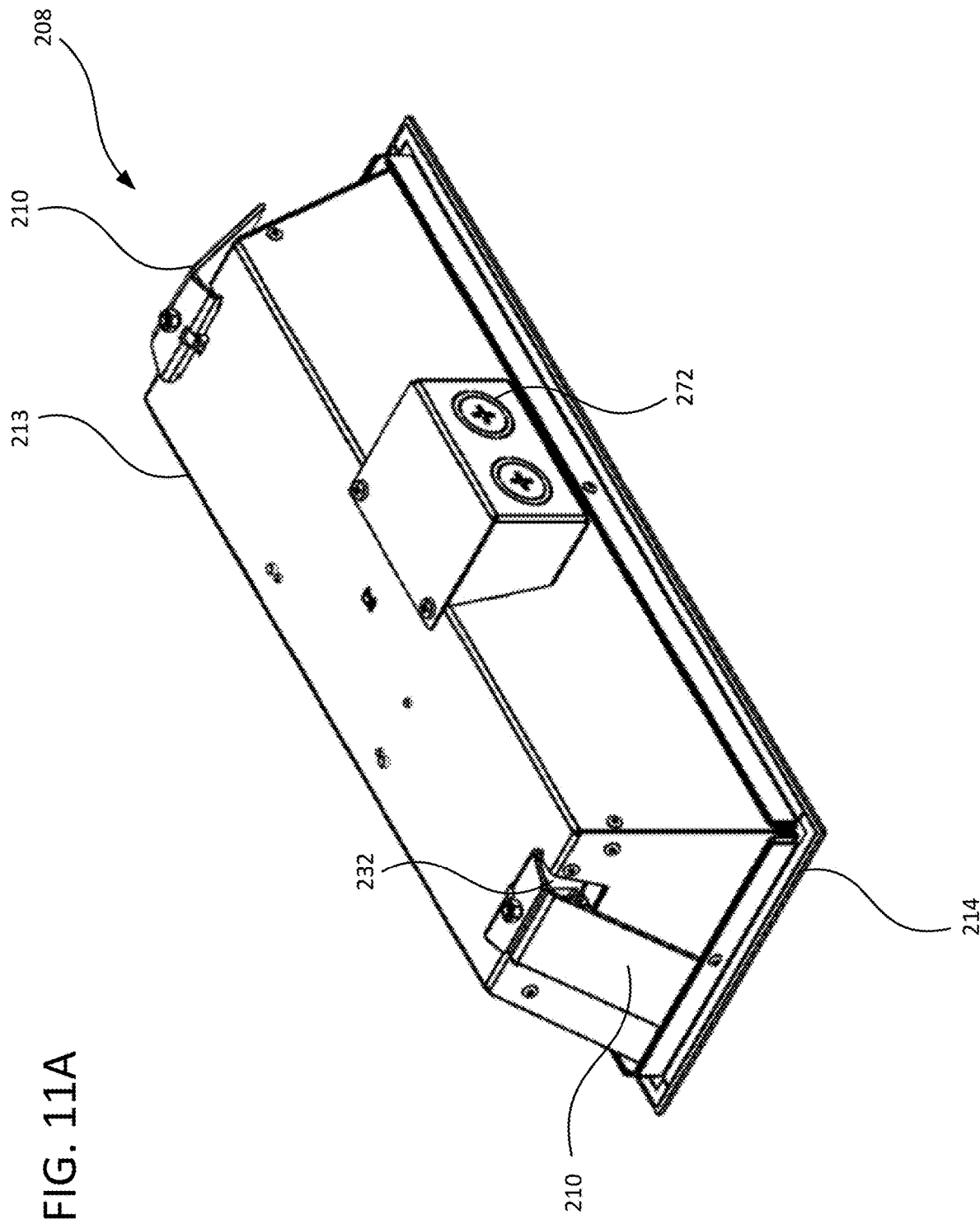
FIG. 11A is a top perspective view of a recessed light housing according to embodiments.
Figure 11C:
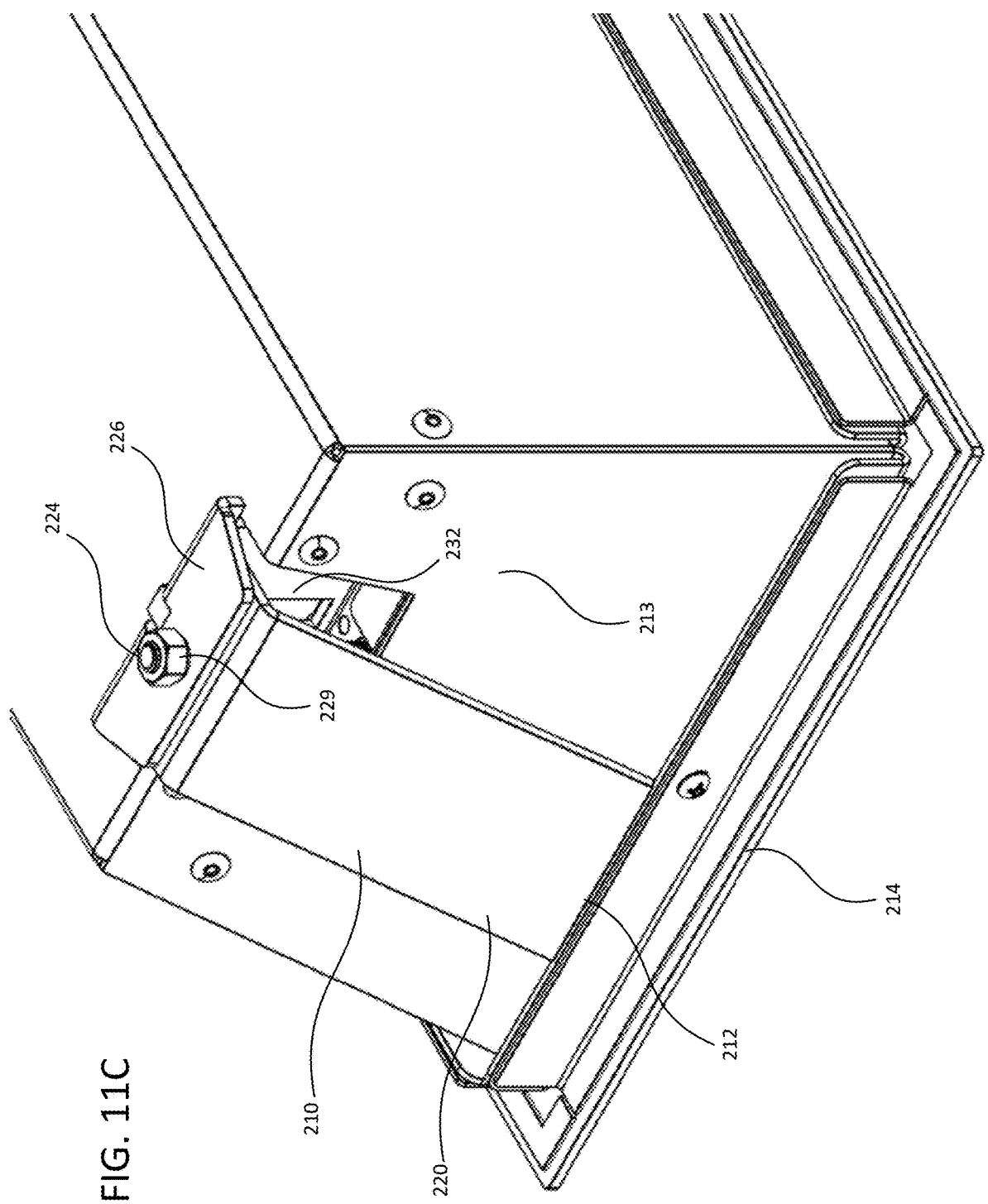
FIG. 11C is a perspective view of an end of the housing of FIG. 11A.
Figure 11D:
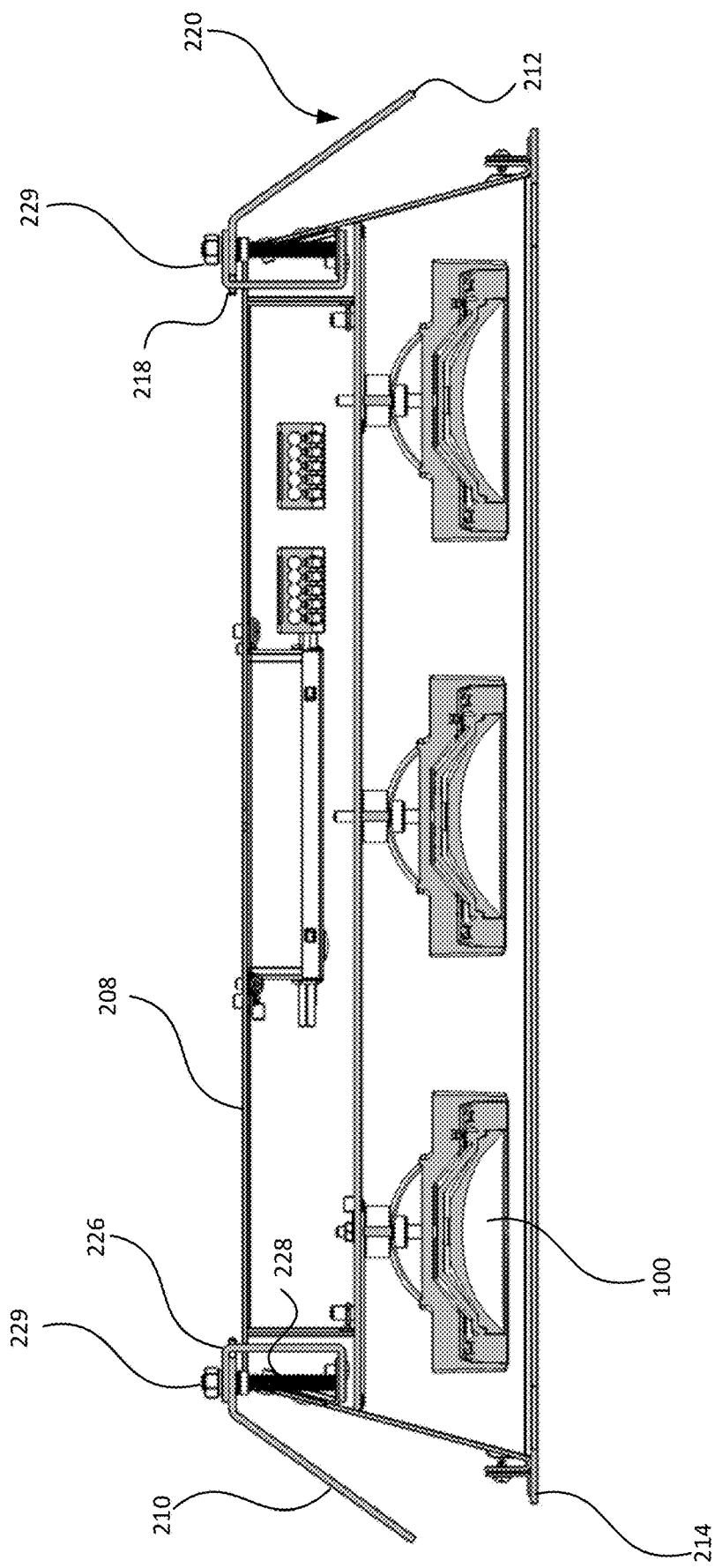
FIG. 11D is a side cross-sectional view of the housing of FIG. 11A.
Figure 11E:
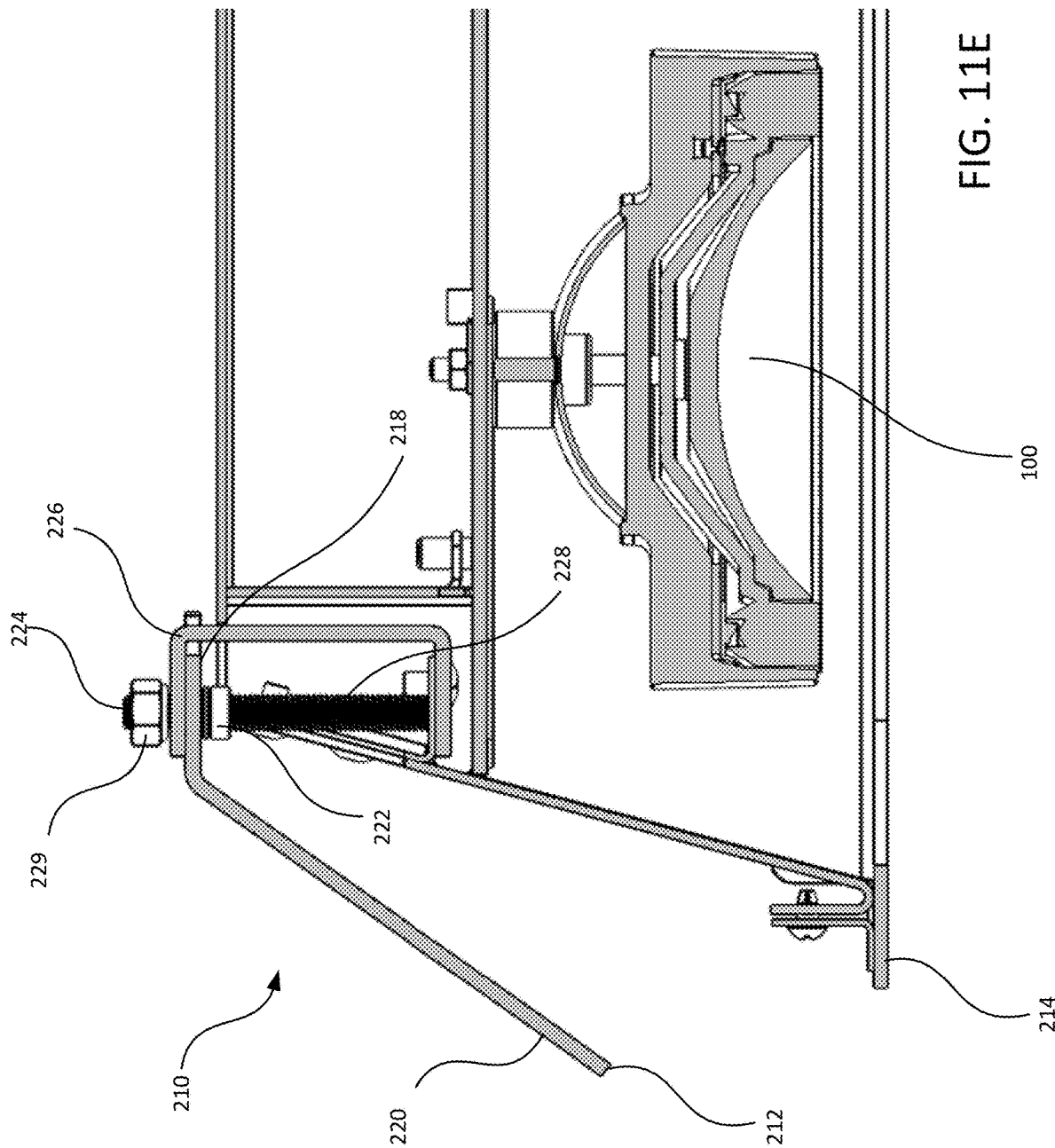
FIG. 11E is a side cross-sectional view of an end of the housing of FIG. 11A.

By using a magnetic element 202 in conjunction with a luminaire having a domed structure 164, a user is easily able to readjust an orientation (and light direction) of the luminaire, even by using only a single hand as the user may simply pivot or otherwise maneuver the luminaire about the magnetic element 202. The flat top section 174 of the domed structure 164 further aids the user in quickly orienting the luminaire in a downward direction. Additionally, the combination of a domed structure 164 and magnetic element 202 ensures that as the luminaire is pivoted the luminaire remained centered relative to the magnetic element 202 to provide improved aesthetics. For example, FIG. 10 shows a fixture 200 having two luminaires 100 mounted therein. A first of the luminaires 100 is oriented in a downward direction, while a second of the luminaires 100 is oriented at an angled. Both luminaires 100 remain centered along a central axis 234 of the fixture 200. While discussed primarily in relation to using magnetic element 202 with the luminaire 100, it will be appreciated that the magnetic element 202 may be used in conjunction with any luminaire that includes a domed structure similar to domed structure 164 described herein.

In some embodiments, the fixture 200 on which the magnetic element 202 is mounted may be a housing 208 that is used to secure the luminaire 100 to a ceiling. As illustrated in FIGS. 11A-11E, the housing 208 is designed to be installed in a ceiling so as to provide a recessed lighting fixture. Housing 208 may include an exterior surface 213 that defines an interior 230 that may receive one or more luminaires 100. Any number of luminaires 100 may be secured in the interior 230. While shown with luminaires 100, it will be appreciated that any design of luminaire may be used in conjunction with housing 208. The luminaires 100 may be fixed directly to the housing 208 and/or may be secured using one or more mounting mechanisms. For example, magnetic elements 202 may be used to secure the luminaires 100 within the interior 230 to enable the luminaires 100 to be adjusted within the housing 208.

As illustrated, the exterior surface 213 is generally trapezoidal such that from below the housing 208 has a generally rectangular shape, however any other shape (such as circles, ovals, octagons, etc.) may be used for housing 208. Typically, the exterior surface 213 has walls that taper inward from a bottom side of the housing 208 to a top side. This taper makes it easier to guide the housing 208 into a recess formed within a ceiling. In some embodiments, the housing 208 may also include a junction box 270 or other wire access location. The junction box 270 may protrude from the exterior surface 213 or be formed within the exterior surface 213 to provide a generally uniform profile.

Oftentimes the installation of recessed lighting fixtures may be difficult for a single electrician or other user, as the user must hold and support the fixture within the ceiling while also attempting to wire the light for electricity prior to fully securing the fixture within the ceiling. The housing 208 illustrated here includes an installation mechanism that helps support and maintain the entire fixture (including the housing 208) within the ceiling, freeing up the user's hands for completing other steps for installing the fixture. This is particularly useful in applications in which the user must stand on a ladder to install the fixture, as freeing up both hands makes the installation process much safer and easier than conventional installation processes. The installation mechanism includes one or more locking arms 210 that extend outward from an exterior surface 213 of the housing 208. Oftentimes, the housing 208 will include multiple locking arms 210, with at least one locking arm 210 on two or more sides of the housing 208. For example, two opposing sides of the housing 208 may include locking arms 210, while in other embodiments locking arms 210 may be provided on multiple adjacent sides of the housing 208. Multiple locking arms 210 may be provided on a single side of the housing 208 in some embodiments. It will be appreciated that any number of locking arms positioned on any combination of one or more sides of the housing 208 are possible.

Each locking arm 210 projects downward and outward at an angle from the exterior surface 213. Oftentimes, this angle is between about 5-45 degrees, more commonly between about 15-30 degrees relative to vertical. An upper portion 218 of the locking arm 210 is coupled with the housing 208, while a lower portion 220 of the locking arm 210 remains unconstrained, allowing the lower portion 220 of the locking arm 210 to move relative to the housing 208. For example, when downward force is applied to a top surface of the lower portion 220 of the locking arm 210, the lower portion 220 of the locking arm 210 may flex inward toward the housing 208. When no outside force is applied to the locking arm 210, the locking arm 210 may remain in a neutral positon in which a bottommost end 212 of the locking arm 210 extends beyond a main body of the housing 208. In the neutral position, the locking arm 210 is configured to extend beyond the edges of an opening in the ceiling in which the housing 208 is to be secured.

The housing 208 may also include a lower lip 214 that extends along one or more sides of the housing 208. Typically, the lower lip 214 extends along at least sides on which each of the locking arms 210 is secured, however other arrangements are possible. The lower lip 214 is designed to be positioned against a lower surface of the ceiling, while the bottommost end 212 of the locking arm 210 is positioned against a top surface of the ceiling. This allows the ceiling to be secured between the bottommost end 212 of the locking arm 210 and the lower lip 214 such that the ceiling supports and secures the housing 208 within an opening formed within the ceiling. In some embodiments, the lower lip 214 may extend around an entire periphery of the housing 208. This may be particularly desirable, as a uniform lower lip may provide a pleasing aesthetic to the installed light fixture. In other embodiments, the lower lip 214 may be present on only one or more sides and/or portions of one or more sides of the housing 208. For example, a lower lip 214 may be positioned on two opposing sides of the housing 208. In other embodiments, a small lower lip 214 may be positioned proximate the bottommost end 212 of the locking arm 210. In other embodiments, at least one lower lip 214 may be positioned on either side of the locking arm 210. Various other arrangements of the lower lip 214 are possible.

In other to accommodate ceilings of different thicknesses, as well as to provide clearance for the housing 208 to be lowered (while still remaining secured within the opening of the ceiling), a distance between the bottommost end 212 of the locking arm 210 and the lower lip 214 may be adjustable. For example, each locking arm 210 may be coupled with the housing 208 via an adjustment mechanism. As illustrated, the upper portion 218 of each locking arm 210 may be bent relative to the lower portion 220 and may include a threaded collar 222. The threaded collar 222 may be engaged with threads of a bolt or screw 224 (or other threaded feature) that is used to secure the locking arm 210 with the housing 208. For example, the screw 224 may be coupled with a bracket 226 or other mounting feature that is affixed to the housing 208 and that defines apertures through which the screw 224 may be inserted. As illustrated, the screw 224 is inserted through both a bottom and top of the bracket 226, with a top end of the screw 224 being secured above the top of the bracket 226 using a nut 229 or other securement mechanism that allows the screw 224 to rotate relative to the bracket 226. The threaded collar 222 may be positioned on a medial portion 228 of the screw 224 between the top and bottom of the bracket 226. When the screw 224 is rotated, the bracket 226 remains stationary while the threaded collar 222 moves up or down the medial portion 228 of the screw 224 (depending on the direction of rotation), causing the locking arm 210 to move up or down, thereby adjusting a distance between the bottommost end 212 of the locking arm 210 and the lower lip 214. An opening 232 may be defined within a body of the housing 208 to provide clearance for movement of the locking arm 210.

In some embodiments, the head of the screw 224 may be accessible within the interior 230 of the housing 208 such that the installer (or other user) may access the screw 224 via the interior 230, allowing the installer to insert a tool to rotate the screw 224 to adjust the distance between the bottommost end 212 of the locking arm 210 and the lower lip 214 when the housing 208 is positioned within an opening in a ceiling. In some embodiments, such as shown here, the screw 224 may be positioned beyond a periphery of the luminaire 100, providing access to the screw 224 even while the luminaire 100 is mounted in place within the interior 230 of the housing 208. In other embodiments, the screw 224 may be positioned above the luminaire 100 such that the luminaire 100 must be at least partially uncoupled and/or removed from the housing 208 to access the screw 224.

In operation, to install the housing 208 within a ceiling, a user may insert the housing 208 into a recess or other opening formed within a ceiling. As the edges of the ceiling about the periphery of the recess contact a top surface of the locking arms 210, the bottommost end 212 of each locking arm 210 is forced downward and inward toward the housing 208 until a top surface of the ceiling is positioned at a height that is below the bottommost end 212 of each locking arm 210. Once this happens, each locking arm 210 may rebound and/or otherwise spring outward away from the housing 208 into a neutral position in which the bottommost end 212 of the locking arm 210 is positioned directly above a portion of the ceiling. This traps a portion of the ceiling between the bottommost end 212 of each locking arm 210 and the lower lip 214.

In some embodiments, the distance between the bottommost end 212 of the locking arm 210 and the lower lip 214 may be greater than a thickness of the ceiling. This distance may be adjustable to allow the housing to be used in ceilings of different thicknesses. To adjust a distance between the bottommost end 212 of each locking arm 210 and the lower lip 214 (to tighten the bottommost end 212 of each locking arm 210 against the top surface of the ceiling and/or to remove the housing 208) the installer may interface a tool, such as a screwdriver, wrench, socket, etc. with the head of the screw 224 to rotate the screw 224. Based on the direction of rotation, the distance between the bottommost end 212 of the locking arm 210 and the lower lip 214 may be increased or decreased. For example, once the user has finished wiring the luminaire 100, the user may rotate the screw 224 to tighten the bottommost end 212 of each locking arm 210 against the top surface of the ceiling, thereby sandwiching a full thickness of the ceiling between the bottommost end 212 of the locking arm 210 and the lower lip 214 to secure the housing 208 within the recess.

In some instances, a user may wish to remove the housing 208 from the recess such as to replace and/or repair the housing 208. To remove the housing 208, the user may rotate the screw 224 to loosen the bottommost end 212 of each locking arm 210 so that the locking arm 210 may be pushed upward and/or otherwise maneuvered within the recess. To fully remove the housing 208, the user may need to pivot the bottommost ends 212 of each locking arm 210 inward to positions that are within the boundary of the opening of the recess. To make this manipulation of the locking arm 210 easier, the housing 208 may define an aperture (not shown) that allows a lever, rod, and/or other tool (such as a screwdriver) to be inserted through the housing such that the tool may contact an end of an underside of the upper portion 218 of the locking arm 210. The user may then pry or otherwise apply an upward force to the end of the underside of the upper portion 218 of the locking arm 210, which will raise the upper portion 218 and draw the lower portion 220 and bottommost end 212 of the locking arm 210 inward of the edges of the recess, thereby enabling the housing 208 to be removed. In some embodiments, the aperture may be open at all times. In other embodiments, the aperture may be covered, such as with a sliding and/or removable cover that provides a gapless interior 230 for the housing 208.

Figure 12:
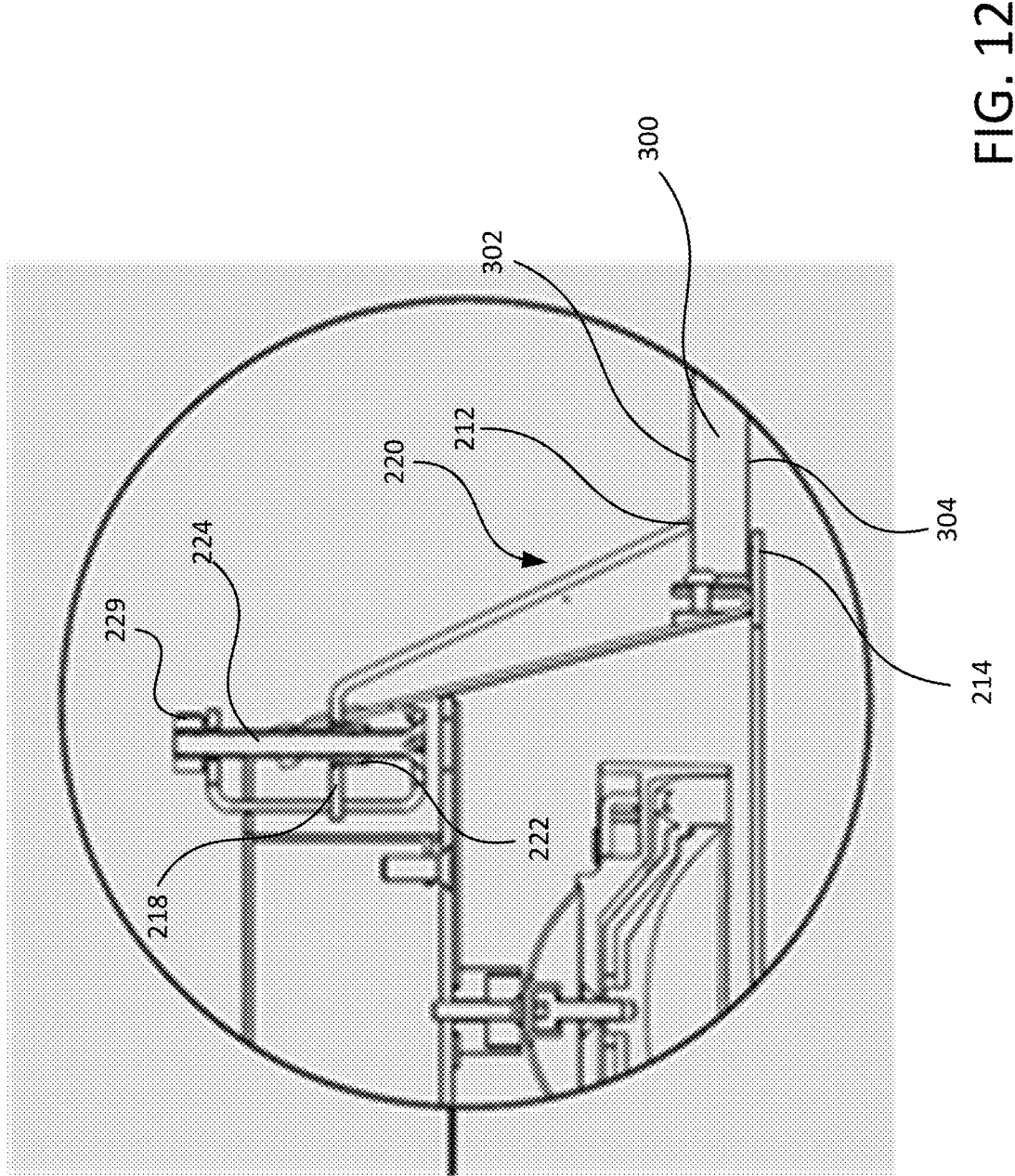
FIG. 12 is a side cross-sectional view of an end of a housing secured within a recess of a ceiling according to embodiments.

FIG. 12 illustrates the housing 208 secured to a ceiling 300 after completion of an installation process. As illustrated, the screw 224 is in a tightened state such that the bottommost end 212 of the locking arm 210 is drawn against a top surface 302 of the ceiling 300, while a top surface of the lower lip 214 is drawn against a lower surface 304 of the ceiling 300. To remove the housing 208 from the recess, the screw 224 may be rotated to raise the bottommost end 212 of the locking arm 210 above a height of the top surface 302. The user may then apply force to the upper portion 218 to move the bottommost end 212 of the locking arm 210 inward within the edge of the ceiling 300, thereby enabling the housing 208 to be lowered out of the opening of the recess.

While described largely in the context of luminaire 100, it will be appreciated that housing 208 may be used in conjunction with any luminaire or light element. Additionally, the housing 208 may be used independently of the magnetic element 202, as any number of mounting mechanisms may be utilized to secure a lighting element within the interior 230 of the housing 208.

Figure 13:
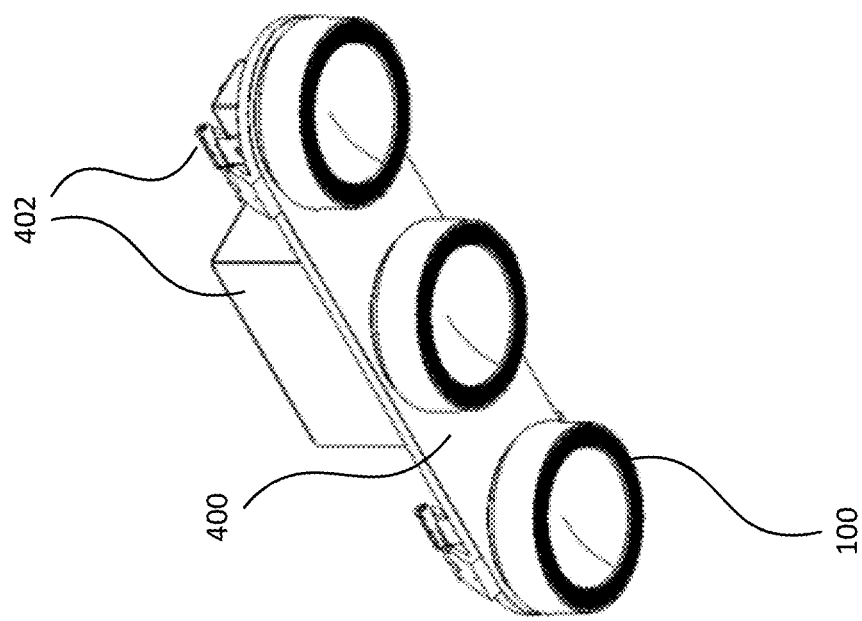
FIG. 13 is a bottom perspective view of a luminaire fixture according to embodiments.

FIG. 13 illustrates another fixture 400 for one or more luminaires 100. Here, the fixture 400 is in the form of an elongate base, with one or more luminaires 100 mounted on an underside of the fixture 400. A top side of the fixture 400 may include various components such as a printed circuit board (PCB) and diffuser 402. The luminaires 100 may be mounted directly to the fixture 400 and/or include intervening mounting structures, which may be adjustable in some embodiments (such as the magnetic elements described herein). Any number, arrangement, and type of luminaire may be mounted on fixture 400.

Figures 14A, 14B:
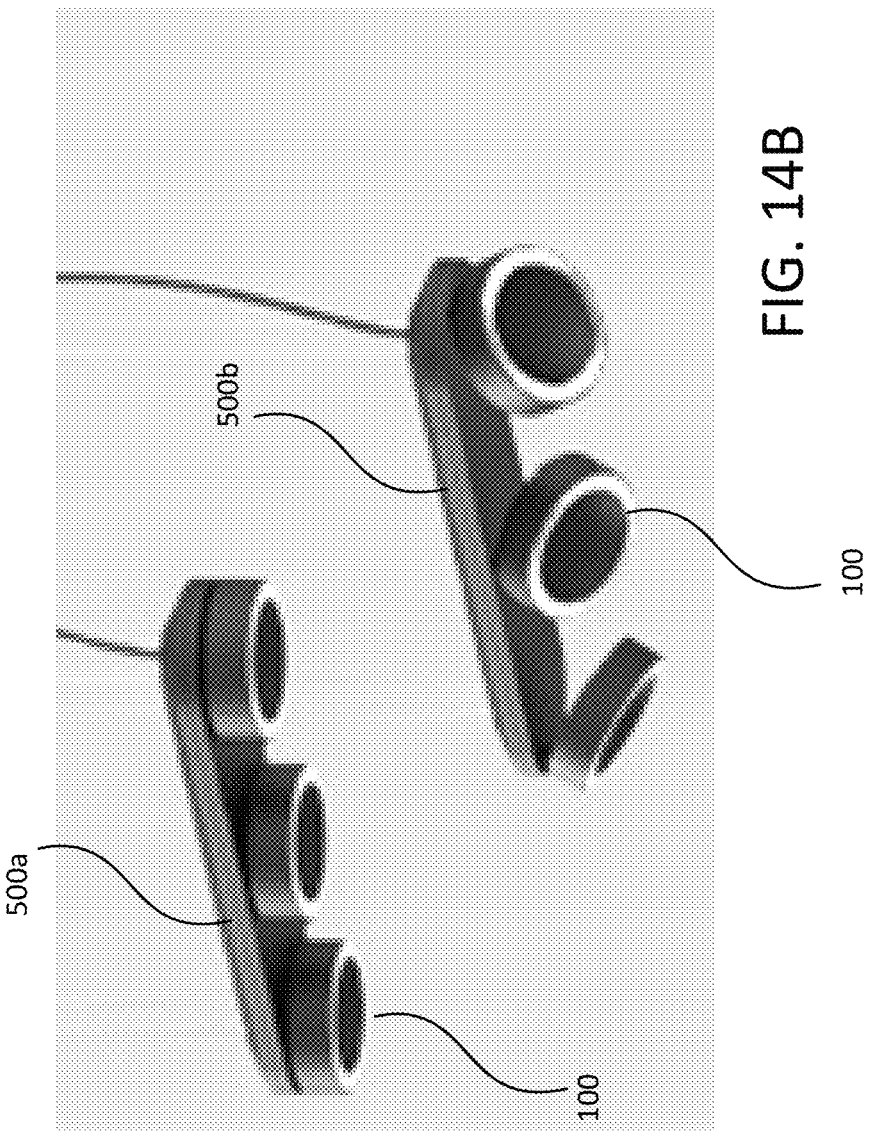
FIG. 14A is a bottom perspective view of a luminaire fixture according to embodiments.
FIG. 14B is a bottom perspective view of the luminaire fixture of FIG. 14A with one the luminaires positioned at different angles.

FIGS. 14A and 14B illustrate another fixture 500 for one or more luminaires 100. Here, the fixture 500 is in the form of an elongate base, with one or more luminaires 100 mounted on an underside of the fixture 500. Various electronic components, such as a printed circuit board (PCB) and/or diffuser may be mounted within the fixture 500. The luminaires 100 may be mounted directly to the fixture 500 and/or include intervening mounting structures, which may be adjustable in some embodiments (such as the magnetic elements described herein). FIG. 14A illustrates the luminaires 100 in a downward orientation relative to fixture 500a, while FIG. 14B illustrates the luminaires 100 in various angled orientations relative to fixture 500b, which may be achieved using the magnetic elements described herein. Any number, arrangement, and type of luminaire may be mounted on fixture 500.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

While illustrative and presently preferred embodiments of the disclosed systems AND methods have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein. As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A non-glare luminaire, comprising:
   a toroidal-shaped light engine comprising a plurality of light emitting diodes (LEDs) disposed about a surface of the light engine, the light engine comprising an axial direction that is at least substantially orthogonal to the surface of the light engine;
   an anti-glare ring disposed proximate the light engine, the anti-glare ring comprising a plurality of reflectors that are arranged in a radial pattern about the anti-glare ring, wherein each reflector is configured to reflect tangentially oriented light from at least one of the plurality of LEDs to be substantially along the axial direction;
   a toroidal integrated optic (TIO), wherein:
      the TIO comprises a toroidal lens portion having a light entrance side and a light exit side;
      the light entrance side is configured to receive light from the plurality of LEDs and the plurality of reflectors; and
      the TIO is configured to collimate the light received from the plurality of LEDs and the plurality of reflectors and emit the light via the light exit side; and
   a base that is configured to receive the TIO, the light engine, and the anti-glare ring, the base comprising a light side and a mounting side, wherein an upper portion of the mounting side of the base comprises a domed portion comprising a ferromagnetic material that is adapted for adjustably mounting the base to a support structure.

2. The non-glare luminaire of claim 1, wherein:
   each of the plurality of reflectors is a parabolic reflector that reflects the tangentially oriented light and reorients the tangentially oriented light into the TIO.

3. The non-glare luminaire of claim 1, wherein:
   the base acts as a heat sink for the non-glare luminaire.

4. The non-glare luminaire of claim 3, wherein:
   the base comprises one or both of copper and aluminum.

5. The non-glare luminaire of claim 1, wherein:
   a number of the plurality of LEDs matches a number of the plurality of reflectors such that each of the plurality of LEDs is in alignment with a respective one of the plurality of reflectors.

6. The non-glare luminaire of claim 5, wherein:
   the anti-glare ring defines a plurality of apertures;
   each of the plurality of apertures is centered between a respective one of the plurality of reflectors; and
   each of the plurality of apertures receives a respective one of the plurality of LEDs such that at least a portion of each respective one of the plurality of LEDs extends into an interior of one of the plurality of reflectors.

7. A luminaire installation assembly, comprising:
   a luminaire; and
   a housing that receives the luminaire and that is configured to be received within a ceiling, wherein:
   each of a first side and a second side of the housing comprises:
      a lower lip; and
      a locking arm extending downward and outward from the housing such that a bottommost end of the locking arm is spaced a distance from the lower lip;
   each locking arm is biased outward to a neutral position such that application of downward force on a top surface of the locking arm pushes the bottommost end of the locking arm inward to allow the housing to be inserted within a recess in the ceiling;
   upon being inserted within the recess, the bottommost end of each locking arm moves outward to the neutral position to constrain a portion of the ceiling between the bottommost end of each locking arm and a respective one of the lower lips; and
   each locking arm is coupled with a manual adjustment member that is adapted to adjust a vertical distance between the bottommost end of the locking arm and a respective one of the lower lip.

8. The luminaire installation assembly of claim 7, wherein:
   the luminaire, comprises:
   a toroidal-shaped light engine comprising a plurality of light emitting diodes (LEDs) disposed about a surface of the light engine, the light engine comprising an axial direction that is at least substantially orthogonal to the surface of the light engine;
   an anti-glare ring disposed proximate the light engine, the anti-glare ring comprising a plurality of reflectors that are arranged in a radial pattern about the anti-glare ring, wherein each reflector is configured to reflect tangentially oriented light from at least one of the plurality of LEDs to be substantially along the axial direction; and
   a toroidal integrated optic (TIO), wherein:
      the TIO comprises a toroidal lens portion having a light entrance side and a light exit side;
      the light entrance side is configured to receive light from the plurality of LEDs and the plurality of reflectors; and
      the TIO is configured to collimate the light received from the plurality of LEDs and the plurality of reflectors and emit the light via the light exit side.

9. The luminaire installation assembly of claim 7, wherein:
   the luminaire comprises a base that couples the luminaire within an interior of the housing.

10. The luminaire installation assembly of claim 9, wherein:
    an interior of the housing comprises a magnetic element; and
    the magnetic element is configured to attract the base to secure the luminaire within the interior of the housing.

11. The luminaire installation assembly of claim 10, wherein:
    the base comprises a domed structure; and
    the magnetic element defines a recess that receives the domed structure such that the domed structure is positionable at different angles within the magnetic element to adjust an angle of the luminaire.

12. The luminaire installation assembly of claim 11, wherein:
    the domed structure comprises a flat top section that enables the luminaire to be aimed directly downward when the flat top section is aligned with the magnetic element.

13. The luminaire installation assembly of claim 7, wherein:

each locking arm comprises an upper portion that is configured to receive an upward force, thereby moving the bottommost end of the locking arm inward and enabling the housing to be removed from the recess.

14. The luminaire installation assembly of claim 7, wherein:
the manual adjustment member comprises a screw that is adapted to adjust the vertical distance between the bottommost end of the locking arm and a respective one of the lower lips.

15. The luminaire installation assembly of claim 14, wherein:
each locking arm comprises a threaded collar that is interfaced with the screw; and
rotation of the screw causes the threaded collar to move along a length of the screw to adjust the distance between the bottommost end of the locking arm and a respective one of the lower lips.

16. A method of installing a luminaire assembly, comprising:
providing a luminaire assembly, the luminaire assembly comprising:
a luminaire; and
a housing that receives the luminaire, wherein:
each of a first side and a second side of the housing comprises:
a lower lip; and
a locking arm extending downward and outward from the housing such that a bottommost end of the locking arm is spaced a distance from the lower lip; and
each locking arm is biased outward to a neutral position;
inserting the housing into a recess formed within a ceiling such that contact between a bottom surface of the ceiling and a top surface of the locking arm forces the bottommost end of the locking arm downward and inward toward the housing;
upon the housing being inserted into the recess far enough that the bottommost end of each locking arm is above a top surface of the ceiling, causing the lower end of the locking arm to move outward to secure a portion of the ceiling between the bottommost end of each locking arm and the lower lip; and
manipulating a manual adjustment member to adjust a vertical distance between the bottommost end of each locking arm and the lower lip to tighten the bottommost end of each locking arm against the top surface of the ceiling.

17. The method of installing a luminaire assembly of claim 16, wherein:
the manual adjustment member comprises a screw that is coupled with the locking arm; and
manipulating a manual adjustment member to adjust the vertical distance comprises turning the screw.

18. The method of installing a luminaire assembly of claim 16, further comprising:
removing the luminaire assembly from the recess.

19. The method of installing a luminaire assembly of claim 18, wherein:
removing the luminaire assembly from the recess comprises:
applying upward force to a top portion of each locking arm to move the bottommost end of the locking arm downward and inward toward the housing; and
lowering the housing out of the recess.

20. The method of installing a luminaire assembly of claim 19, wherein:
applying upward force to the top portion of each locking arm comprises inserting a tool through an aperture formed within the housing to engage the top portion of each locking arm.

21. The method of installing a luminaire assembly of claim 20, further comprising:
moving a cover to expose the aperture prior to inserting the tool.

22. The method of installing a luminaire assembly of claim 19, further comprising:
increasing the distance between the bottommost end of each locking arm and the respective one of the lower lips prior to applying upward force to the top portion of each locking arm.

23. The method of installing a luminaire assembly of claim 22, wherein:
increasing the distance comprises turning a screw that is coupled with the locking arm.

* * * * *